(12) United States Patent
Yoshikawa et al.

(10) Patent No.: US 11,387,758 B2
(45) Date of Patent: Jul. 12, 2022

(54) MOTOR CONTROLLER AND IMAGE FORMING APPARATUS

(71) Applicant: KONICA MINOLTA, INC., Tokyo (JP)

(72) Inventors: Hiroyuki Yoshikawa, Toyohashi (JP); Yuta Tachibana, Toyokawa (JP); Daichi Suzuki, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 206 days.

(21) Appl. No.: 16/713,087

(22) Filed: Dec. 13, 2019

(65) Prior Publication Data

US 2020/0195181 A1 Jun. 18, 2020

(30) Foreign Application Priority Data

Dec. 18, 2018 (JP) .............................. JP2018-236409

(51) Int. Cl.
*H02P 9/18* (2006.01)
*H02P 8/20* (2006.01)
*H02P 21/18* (2016.01)
*H02P 21/22* (2016.01)
*G03G 15/00* (2006.01)
*H02P 27/12* (2006.01)

(52) U.S. Cl.
CPC ......... *H02P 21/18* (2016.02); *G03G 15/6529* (2013.01); *G03G 15/80* (2013.01); *H02P 21/22* (2016.02); *H02P 27/12* (2013.01); *H02P 2203/03* (2013.01)

(58) Field of Classification Search
CPC .................................. H02P 21/36; H02P 6/30
See application file for complete search history.

(56) References Cited

U.S. PATENT DOCUMENTS

| 4,876,491 | A | 10/1989 | Squires et al. |
| 2007/0132424 | A1* | 6/2007 | Takao ..................... H02P 21/24 318/806 |
| 2011/0033173 | A1* | 2/2011 | Bonner ................... H02P 21/22 388/805 |
| 2018/0013363 | A1* | 1/2018 | Yamamoto ............... H02P 8/02 |

FOREIGN PATENT DOCUMENTS

JP          2547778 B2    3/1988

* cited by examiner

*Primary Examiner* — Muhammad S Islam
*Assistant Examiner* — Charles S Laughlin
(74) *Attorney, Agent, or Firm* — Buchanan Ingersoll & Rooney PC

(57) ABSTRACT

A motor controller estimates an initial position of a magnetic pole of a rotor of a brushless DC motor in an inductive sensing scheme. The motor controller controls a drive circuit to apply an AC voltage to a stator winding at a first energization angle, and subsequently to apply an AC voltage to the stator winding at a second energization angle before a residual current flowing through the stator winding returns to zero. At each energization angle, the motor controller corrects a peak value of a current in the stator winding based on the residual current detected immediately before a voltage is applied to the stator winding or at a time when voltage application to the stator winding is started. Based on the corrected peak value, the control circuit estimates the initial position of the magnetic pole of the rotor.

10 Claims, 18 Drawing Sheets

| $\theta_M$ | Iu | Iv | Iw | Iα | Iβ | Iγ |
|---|---|---|---|---|---|---|
| 0 DEGREE | 1.0A | −0.5A | −0.5A | 1.225A | 0.000A | 1.225A |
| 45 DEGREES | 1.0A | −0.5A | −0.5A | 1.225A | 0.000A | 0.866A |
| 90 DEGREES | 1.0A | −0.5A | −0.5A | 1.225A | 0.000A | 0.000A |
| 135 DEGREES | 1.0A | −0.5A | −0.5A | 1.225A | 0.000A | −0.866A |
| 180 DEGREES | 1.0A | −0.5A | −0.5A | 1.225A | 0.000A | −1.225A |
| 225 DEGREES | 1.0A | −0.5A | −0.5A | 1.225A | 0.000A | −0.866A |
| 270 DEGREES | 1.0A | −0.5A | −0.5A | 1.225A | 0.000A | 0.000A |
| 315 DEGREES | 1.0A | −0.5A | −0.5A | 1.225A | 0.000A | 0.866A |
| 360 DEGREES | 1.0A | −0.5A | −0.5A | 1.225A | 0.000A | 1.225A |

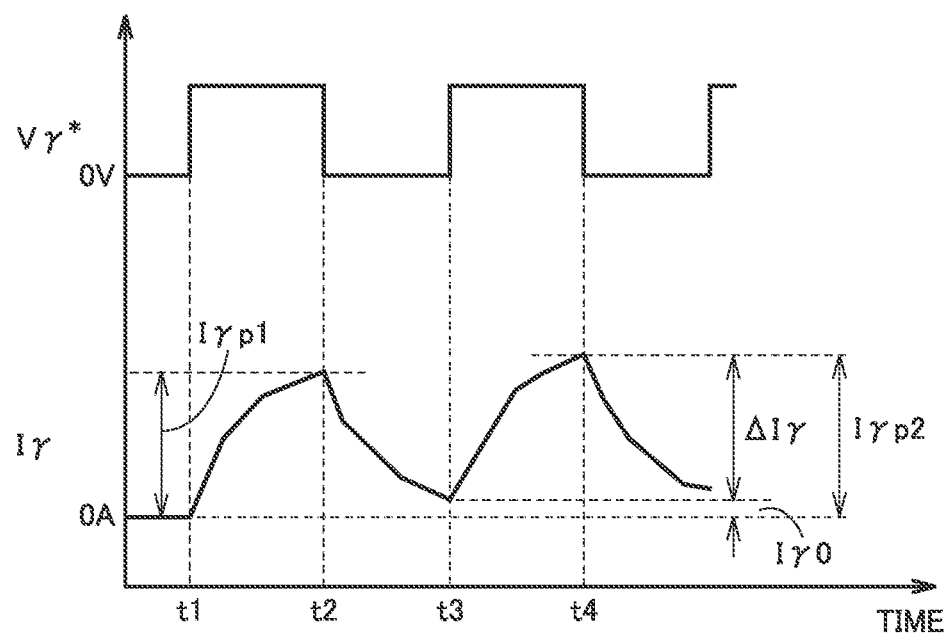

FIG.12

| i | $\theta_M[i]$ | $\cos(\theta_M[i])$ | $\sin(\theta_M[i])$ |
|---|---|---|---|
| 1 | 0 | 1.0000 | 0.0000 |
| 2 | 180 | −1.0000 | 0.0000 |
| 3 | 30 | 0.8660 | 0.5000 |
| 4 | 210 | −0.8660 | −0.5000 |
| 5 | 60 | 0.5000 | 0.8660 |
| 6 | 240 | −0.5000 | −0.8660 |
| 7 | 90 | 0.0000 | 1.0000 |
| 8 | 270 | 0.0000 | −1.0000 |
| 9 | 120 | −0.5000 | 0.8660 |
| 10 | 300 | 0.5000 | −0.8660 |
| 11 | 150 | −0.8660 | 0.5000 |
| 12 | 330 | 0.8660 | −0.5000 |

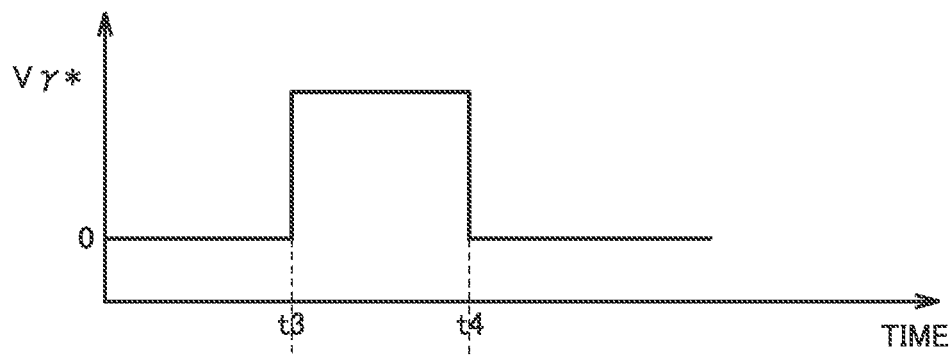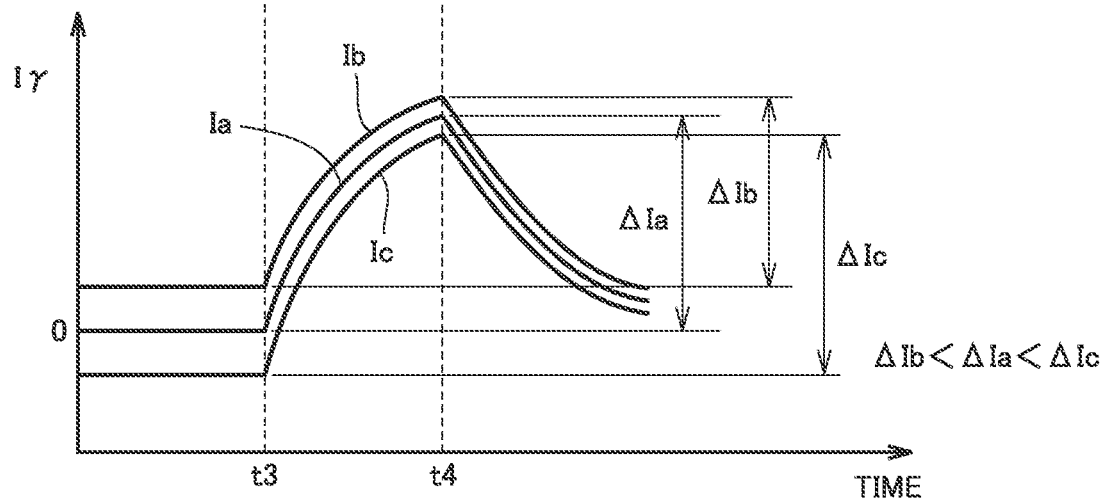

| RESIDUAL CURRENT Iγ0 | CURRENT CHANGE AMOUNT ΔIγ | Iγp DETECTION VALUE (BEFORE CORRECTION) | Iγp DETECTION VALUE (AFTER CORRECTION) |
|---|---|---|---|
| 0.030 | 2.291 | 2.321 | 2.300111 |
| 0.027 | 2.292 | 2.319 | 2.300117 |
| 0.024 | 2.293 | 2.317 | 2.300119 |
| 0.021 | 2.294 | 2.315 | 2.300117 |
| 0.018 | 2.295 | 2.313 | 2.300112 |
| 0.015 | 2.296 | 2.311 | 2.300103 |
| 0.012 | 2.296 | 2.308 | 2.30009 |
| 0.009 | 2.297 | 2.306 | 2.300073 |
| 0.006 | 2.298 | 2.304 | 2.300052 |
| 0.003 | 2.299 | 2.302 | 2.300028 |
| 0.000 | 2.300 | 2.300 | 2.300 |
| -0.003 | 2.301 | 2.298 | 2.299968 |
| -0.006 | 2.302 | 2.296 | 2.299932 |
| -0.009 | 2.303 | 2.294 | 2.299893 |
| -0.012 | 2.304 | 2.292 | 2.29985 |
| -0.015 | 2.305 | 2.290 | 2.299803 |
| -0.018 | 2.305 | 2.287 | 2.299752 |
| -0.021 | 2.306 | 2.285 | 2.299697 |
| -0.024 | 2.307 | 2.283 | 2.299639 |
| -0.027 | 2.308 | 2.281 | 2.299577 |
| -0.030 | 2.309 | 2.279 | 2.299511 |

FIG.15

| γ-AXIS RESIDUAL CURRENT Iγ0 [A] | CORRECTION COEFFICIENT | DETECTION VALUE OF Iγp (BEFORE CORRECTION) | DETECTION VALUE OF Iγp (AFTER CORRECTION) |
|---|---|---|---|
| Iγ0 ≥ 0.01 | 0.97 | 2.370A | 2.299A |
| 0.01 > Iγ0 ≥ 0.003 | 0.98 | 2.340A | 2.293A |
| 0.003 > Iγ0 > -0.003 | 1 | 2.300A | 2.300A |
| -0.003 ≥ Iγ0 > -0.01 | 1.001 | 2.227A | 2.229A |
| -0.01 ≥ Iγ0 | 1.002 | 2.225A | 2.229A |

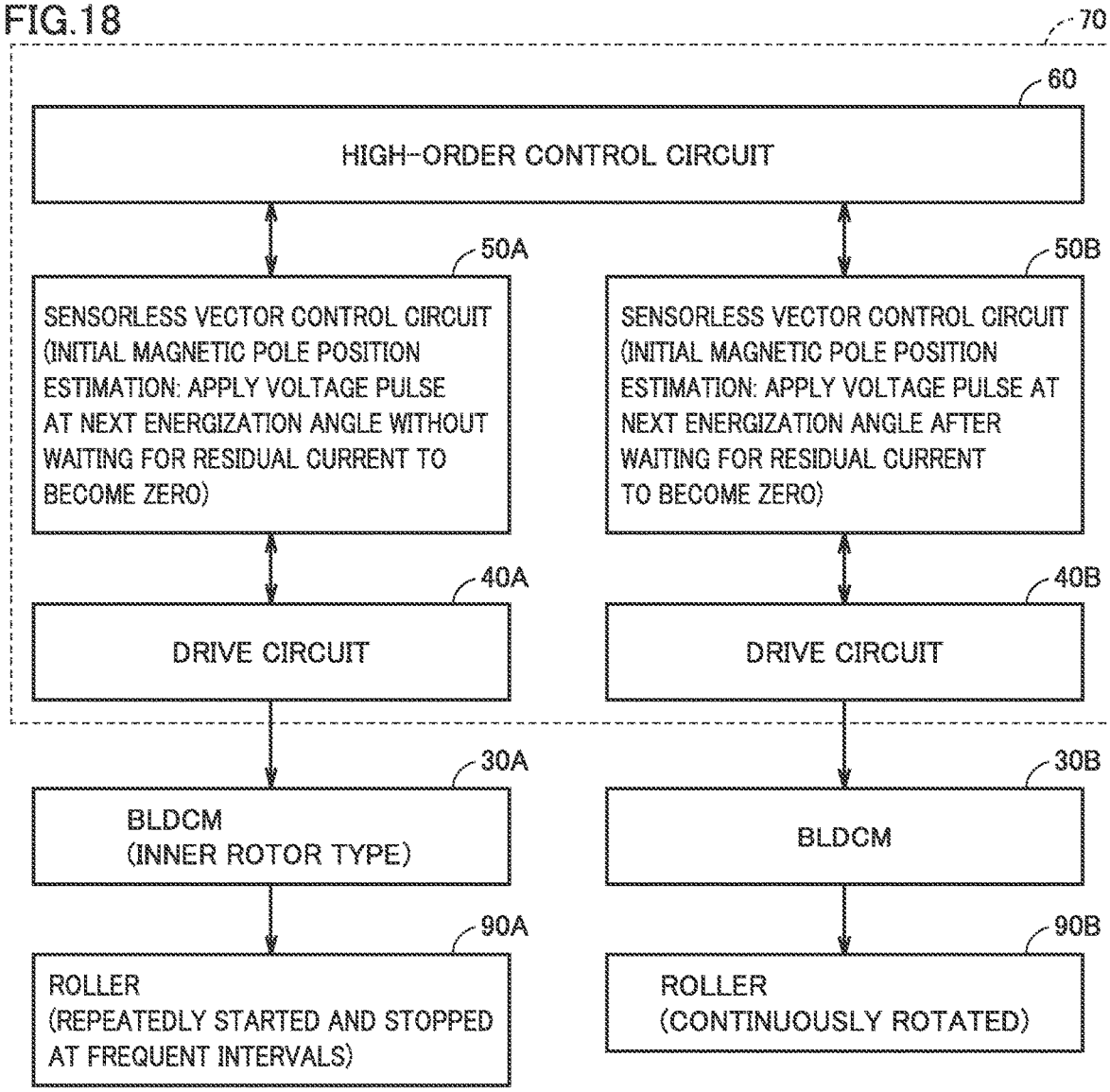

MOTOR CONTROLLER AND IMAGE FORMING APPARATUS

The entire disclosure of Japanese Patent Application No. 2018-236409 filed on Dec. 18, 2018 is incorporated herein by reference in its entirety.

BACKGROUND

Technological Field

The present disclosure relates to a motor controller, and also relates to an image forming apparatus including the motor controller for controlling a motor for driving a rotor. In particular, the present disclosure relates to motor control performed when a sensorless-type brushless DC motor (also referred to as a permanent-magnet synchronous motor) is started.

Description of the Related Art

A sensorless-type brushless DC motor docs not include a sensor for detecting a magnetic pole position of a permanent magnet of a rotor with respect to each phase coil of a stator. Accordingly, a method of estimating a magnetic pole position of a rotor based on the induced voltage generated in a stator winding during rotation of the rotor is commonly used. However, this method requires the rotor to be rotated enough to allow detection of the induced voltage, and therefore, cannot be used as a method of estimating the initial position of the magnetic pole of the rotor in the rest state before the motor is started.

Thus, an inductive sensing method (for example, see Japanese Patent No. 2547778) is known as a method of estimating a magnetic pole position of a rotor in the rest state. The method of estimating an initial position through inductive sensing utilizes the property of an effective inductance that slightly changes in accordance with the positional relation between the magnetic pole position of the rotor and the current magnetic field by the stator winding when the stator winding is applied with a voltage at a level not causing rotation of the rotor at a plurality of electrical angles. Specifically, according to Japanese Patent No. 2547778, the position of the magnetic pole of the rotor is indicated by the energization angle showing the highest current value at the time when the stator winding is applied with a voltage at each electrical angle for a prescribed energization time period.

SUMMARY

In the inductive sensing method, a voltage needs to be applied to a stator winding at a plurality of electrical angles (hereinafter also referred to as energization angles). When a pulse voltage is applied to the stator winding at a certain energization angle, the winding current starts to increase. Then, the winding current continuously increases during application of the voltage for a prescribed time period. When application of the pulse voltage is ended, the winding current gradually decreases. When application of a voltage to the stator winding is started at a next energization angle, the winding current again starts to increase. Subsequently, the winding current repeatedly changes in a similar manner.

In order to accurately detect the initial position of the magnetic pole of the rotor in this case, the winding current needs to realm to zero during a time period from when application of a voltage to the stator winding at a certain energization angle is ended to when application of a voltage to the stator winding at the next energization angle is started. This is due to the following reason. Specifically, since the initial position of the magnetic pole of the rotor is usually estimated based on the peak value of the winding current during application of a voltage to the stator winding, any residual current leads to an error in the value of the peak current.

On the other hand, in order to improve the accuracy of estimating the initial position of the magnetic pole of the rotor, a voltage needs to be applied to the stator winding at a lot of energization angles to detect the peak current during application of the voltage. Thus, waiting for the residual current of the stator winding to return to completely zero 0 after each voltage application requires lengthy time to estimate the initial position of the magnetic pole of the rotor. In the application for which a motor needs to be frequently turned on and off, lengthy time required to estimate the initial position of the magnetic pole of the rotor is problematic. However, when the number of energization angles during inductive sensing is reduced so as to reduce the time required to estimate the initial position, the accuracy of estimating the initial position of the magnetic pole deteriorates, which may lead to a risk of synchronization loss while the motor is being started.

The present disclosure has been made in consideration of the above-described problems. An object of the present disclosure is to provide a controller for a brushless DC motor that allows accurate estimation of an initial position of a magnetic pole of a rotor in a short time period using an inductive sensing method.

To achieve at least one of the above-mentioned objects, according to an aspect of the present invention, a motor controller for controlling a brushless DC motor of a sensorless-type in one embodiment reflecting one aspect of the present invention comprises: a drive circuit that applies a voltage to each phase of a stator winding of the brushless DC motor; a current detection circuit that detects a current flowing through the stator winding; and a control circuit that controls the drive circuit. The control circuit includes an initial position estimation unit that estimates an initial position of a magnetic pole of a rotor of the brushless DC motor. In a case where the control circuit estimates an initial position of a magnetic pole of a rotor of the brushless DC motor, the drive circuit continuously or intermittently applies a constant voltage to the stator winding during a prescribed energization time period at each of a plurality of energization angles while sequentially changing the plurality of energization angles. Applying the constant voltage to the stator winding at each of the plurality of energization angles includes applying the constant voltage at a first energization angle arbitrarily selected from among the plurality of energization angles and subsequently applies the constant voltage at a second energization angle, wherein the drive circuit starts voltage application at the second energization angle after the drive circuit ends voltage application at the first energization angle and before a residual current flowing through the stator winding returns to zero. At each of the plurality of energization angles, the current detection circuit detects: a value of the residual current immediately before voltage application is started or at a time when voltage application is started; and a peak value of the current flowing through the stator winding during the prescribed energization time period. The initial position estimation unit corrects the peak value of the current by the detected value of the residual current, and estimates the initial position of the magnetic pole of the rotor based on the corrected peak value of the current that is obtained at each of the plurality of energization angles.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 10 is a timing chart schematically illustrating an example of a waveform of the γ-axis current in the case where a residual current exists.

FIG. 12 is a diagram showing an example of a table storing energization angles as well as cosine values and sine values that correspond to their respective energization angles.

FIGS. 13A and 13B are schematic timing charts each showing an example of the relation between the value of a γ-axis residual current and the peak value of the γ-axis current.

FIG. 15 is a diagram showing an example of a correction table used for correcting a γ-axis current change amount in accordance with the γ-axis residual current.

FIG. 18 is a block diagram showing the configuration of: a motor used for controlling driving of a roller of the image forming apparatus; and its controller.

DETAILED DESCRIPTION OF EMBODIMENTS

Figure 1:
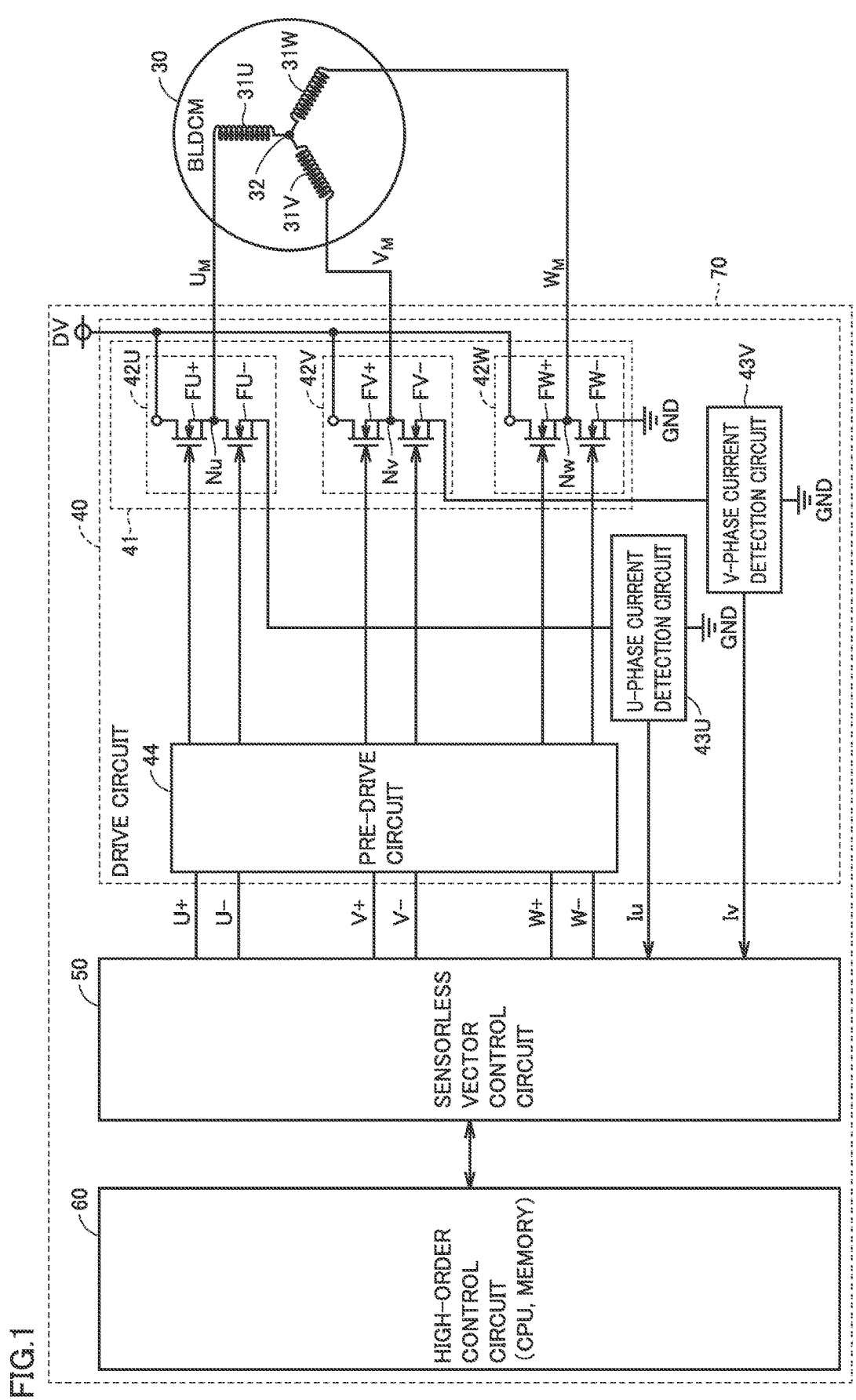
FIG. 1 is a block diagram showing the entire configuration of a motor controller.

Hereinafter, one or more embodiments of the present invention will be described with reference to the drawings. However, the scope of the invention is not limited to the disclosed embodiments.

In the drawings, the same or corresponding components will be designated by the same reference characters, and description thereof will not be repeated.

First Embodiment

[Entire Configuration of Motor Controller]

FIG. 1 is a block diagram showing the entire configuration of a motor controller. A motor controller 70 controls driving of a sensorless-type three-phase brushless DC motor (BLDCM) 30. As shown in FIG. 1, motor controller 70 includes a drive circuit 40, a sensorless vector control circuit 50, and a high-order control circuit 60. Due to a sensorless-type, a Hall element or an encoder for detecting the rotation position of a rotor is not provided.

Drive circuit 40, which is an inverter circuit of a pulse width modulation (PWM) control scheme, converts a direct-current (DC) drive voltage DV into a three-phase alternating-current (AC) voltage, and outputs the converted three-phase AC voltage. Specifically, based on inverter drive signals U+, U−, V+, V−, W+, and W− as PWM signals received from sensorless vector control circuit 50, drive circuit 40 supplies a U-phase voltage $U_M$, a V-phase voltage $V_M$, and a W-phase voltage $W_M$ to brushless DC motor 30. Drive circuit 40 includes an inverter circuit 41, a U-phase current detection circuit 43U, a V-phase current detection circuit 43V, and a pre-drive circuit 44.

Inverter circuit 41 includes a U-phase arm circuit 42U, a V-phase arm circuit 42V, and a W-phase arm circuit 42W. These arm circuits 42U, 42V, and 42W are connected in parallel with one another between the node receiving DC drive voltage DV and the node receiving a ground voltage GND. For simplifying the following description, the node receiving DC drive voltage DV will be referred to as a drive voltage node DV while the node receiving ground voltage GND will be referred to as a ground node GND.

U-phase arm circuit 42U includes a U-phase transistor FU+ on the high potential side and a U-phase transistor FU− on the low potential side that are connected in series to each other. A connection node Nu between U-phase transistors FU+ and FU− is connected to one end of a U-phase winding 31U of brushless DC motor 30. The other end of U-phase winding 31U is connected to a neutral point 32.

As shown in FIG. 1, a U-phase winding 31U, a V-phase winding 31V, and a W-phase winding 31W of brushless DC motor 30 are coupled in a star connection. In the present specification, U-phase winding 31U, V-phase winding 31V, and W-phase winding 31W will be collectively referred to as a stator winding 31.

Similarly, V-phase arm circuit 42V includes a V-phase transistor FV+ on the high potential side and a V-phase transistor FV− on the low potential side that are connected in series to each other. A connection node Nv between V-phase transistors FV+ and FV− is connected to one end of V-phase winding 31V of brushless DC motor 30. The other end of V-phase winding 31V is connected to neutral point 32.

Similarly, W-phase arm circuit 42W includes a W-phase transistor FW+ on the high potential side and a W-phase transistor FW− on the low potential side that are connected in series to each other. A connection node Nw between W-phase transistors FW+ and FW− is connected to one end of W-phase winding 31W of brushless DC motor 30. The other end of W-phase winding 31W is connected to neutral point 32.

U-phase current detection circuit 43U and V-phase current detection circuit 43V serve as circuits for detecting a motor current with a two-shunt method. Specifically, U-phase current detection circuit 43U is connected between U-phase transistor FU− on the low potential side and ground node GND. V-phase current detection circuit 43V is connected between V-phase transistor FV− on the low potential side and ground node GND.

U-phase current detection circuit 43U and V-phase current detection circuit 43V each include a shunt resistance. The resistance value of the shunt resistance is as small as the order of $\frac{1}{10}\Omega$. Thus, the signal showing a U-phase current Iu detected by U-phase current detection circuit 43U and the signal showing a V-phase current Iv detected by V-phase current detection circuit 43V are amplified by an amplifier (not shown). Then, the signal showing U-phase current Iu and the signal showing V-phase current Iv are analog-to-digital (AD)-converted by an AD converter (not shown) and thereafter fed into sensorless vector control circuit 50.

A W-phase current by docs not need to be detected since it can be calculated according to Kirchhoff's current rule based on U-phase current Iu and V-phase current Iv, that is, in accordance with Iw=−Iu−Iv. More generally, among U-phase current Iu, V-phase current Iv, and W-phase current Iw, two phase currents only have to be detected and the value of remaining one phase current can be calculated from the values of these two phase currents.

Pre-drive circuit 44 amplifies inverter drive signals U+, U−, V+, V−, W+, and W− that are PWM signals received from sensorless vector control circuit 50 so as to be output to the gates of transistors FU+, FU−, FV+, FV−, FW+, and FW−, respectively.

The types of transistors FU+, FU−, FV+, FV−, FW+, and FW− are not particularly limited, and, for example, may be a metal oxide semiconductor field effect transistor (MOSFET), may be a bipolar transistor, or may be an insulated gate bipolar transistor (IGBT).

Sensorless vector control circuit 50, which serves as a circuit for vector-controlling brushless DC motor 30, generates inverter drive signals U+, U−, V+, V−, W+, and W−, and supplies the generated signals to drive circuit 40. Furthermore, when brushless DC motor 30 is started, sensorless vector control circuit 50 estimates the initial position of the magnetic pole of the rotor in the rest state by an inductive sensing scheme.

Sensorless vector control circuit 50 may be configured as a dedicated circuit such as an application specific integrated circuit (ASIC), or may be configured to implement its function utilizing a field programmable gate array (FPGA) and/or a microcomputer.

High-order control circuit 60 is configured based on a computer including a central processing unit (CPU), memory, and the like. High-order control circuit 60 outputs a start command, a stop command, a rotation angle speed command value, and the like to sensorless vector control circuit 50.

Unlike the above-described configuration, sensorless vector control circuit 50 and high-order control circuit 60 may be configured as one control circuit by an ASIC, an FPGA or the like.

[Overview of Motor Operation]

Figure 2:
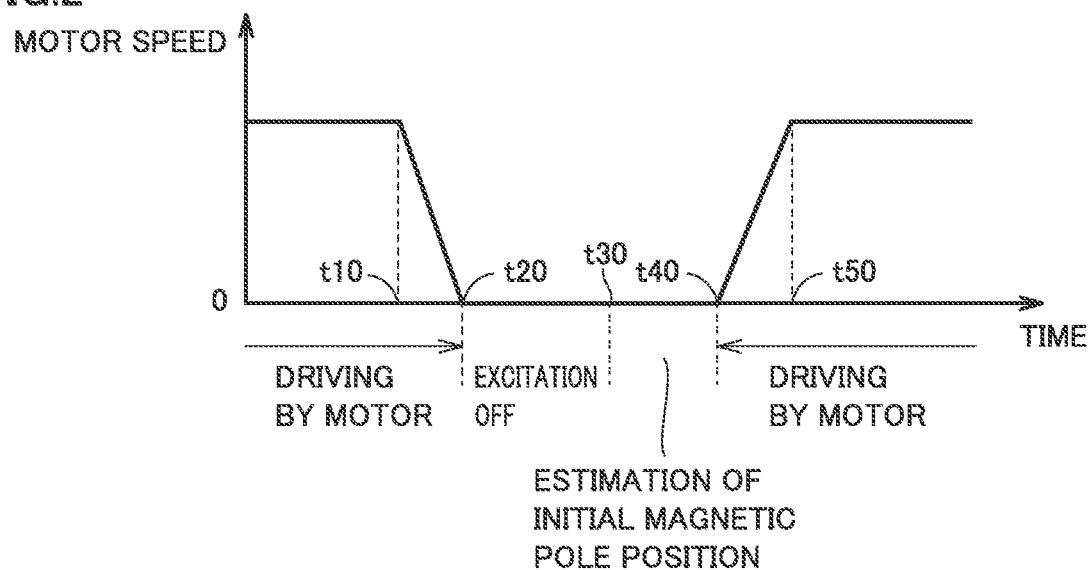
FIG. 2 is a timing chart showing a motor rotation speed in a time period from when a motor in a steady operation is stopped to when the motor is restarted.

FIG. 2 is a timing chart showing a motor rotation speed in a time period from when a motor in a steady operation is stopped to when the motor is restarted. The horizontal axis shows time while the vertical axis shows the rotation speed of the motor.

Referring to FIG. 2, the motor is decelerated in a time period from a time point t10 to a time point t20. Then, at time point t20, rotation of the motor is stopped. Supply of an exciting current to a stator is stopped in a time period from time point t20 to a time point t30.

Before the motor is restarted from a time point t40, the initial position of the magnetic pole of the rotor is estimated in a time period from time point t30 to time point t40. In order to apply a torque in the rotation direction to the rotor, a three-phase AC current needs to be supplied to suitor winding 31 at an appropriate electrical angle in accordance with the initial position of the magnetic pole of the rotor. Thereby, the initial position of the magnetic pole of the rotor is estimated. In the present disclosure, an inductive sensing scheme is used as a method of estimating an initial position of a magnetic pole of a rotor.

When rotation of the rotor is started at time point t40, the brushless DC motor is subsequently controlled by a sensorless vector control scheme. The steady operation at a fixed rotation speed is started from a time point t50.

[Coordinate Axes in Sensorless Vector Control Scheme]

Figure 3:
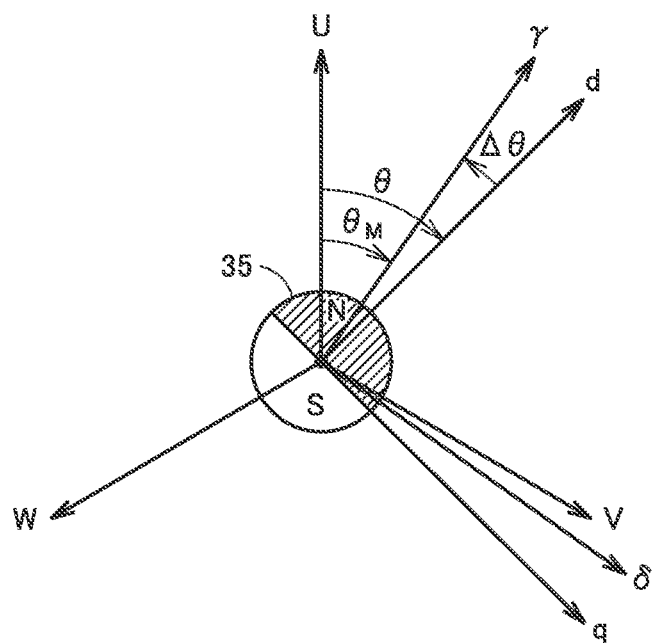
FIG. 3 is a diagram for illustrating coordinate axes for illustrating an alternating current and a magnetic pole position in sensorless vector control.

FIG. 3 is a diagram for illustrating coordinate axes for illustrating an alternating current and a magnetic pole position in sensorless vector control.

Referring to FIG. 3, in vector control, a three-phase (a U-phase, a V-phase, a W-phase) alternating current flowing through stator winding 31 of three-phase brushless DC motor 30 is subjected to variable transformation into a two-phase component allowing rotation in synchronization with the permanent magnet of the rotor. Specifically, the direction of the magnetic pole of rotor 35 is defined as a d-axis while the direction in which the phase advances at an electrical angle of 90° from the d-axis is defined as a q-axis. Furthermore, the angle of the d-axis from the U-phase coordinate axis is defined as θ.

In the case of a sensorless vector control scheme as a control scheme not utilizing a position sensor for detecting the rotation angle of the rotor, the position information showing the rotation angle of the rotor needs to be estimated by a certain method. The estimated magnetic pole direction is defined as a γ-axis while the direction in which the phase advances at an electrical angle of 90° from the γ-axis is defined as a δ-axis. The angle of the γ-axis from the U-phase coordinate axis is defined as $\theta_M$. The delay of $\theta_M$ with respect to θ is defined as Δθ.

The coordinate axis in FIG. 3 is used also when the initial position of the magnetic pole of the rotor in the rest state is estimated in an inductive sensing scheme at the time when the motor is started. In this case, the true position of the magnetic pole of the rotor is indicated by an electrical angle θ. The electrical angle of the current that is caused to flow through stator winding 31 (also referred to as an energization angle or a voltage application angle) for estimating the initial position of the magnetic pole is indicated by $\theta_M$.

[Vector Control During Motor Operation]

Figure 4:
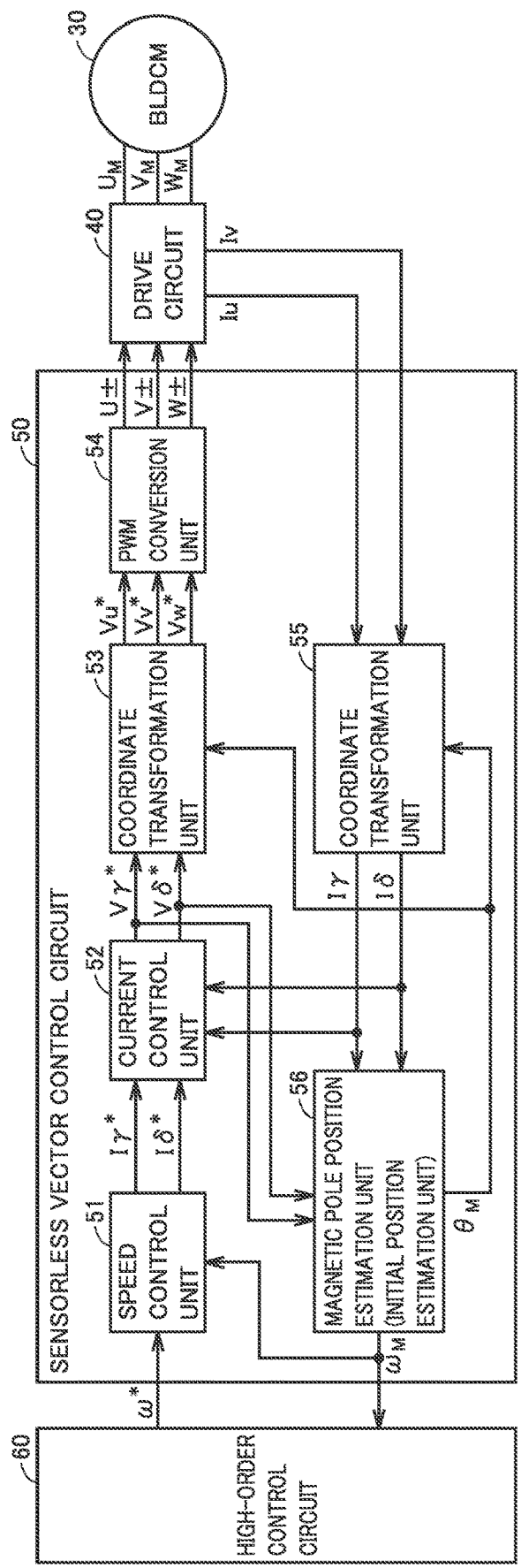
FIG. 4 is a functional block diagram showing the operation of a sensorless vector control circuit during the operation of the motor.

FIG. 4 is a functional block diagram showing the operation of a sensorless vector control circuit during the operation of the motor. Referring to FIG. 4, the operation of sensorless vector control circuit 50 during motor operation will be hereinafter simply described.

Sensorless vector control circuit 50 includes a coordinate transformation unit 55, a rotation speed control unit 51, a current control unit 52, a coordinate transformation unit 53, a PWM conversion unit 54, and a magnetic pole position estimation unit 56.

Coordinate transformation unit 55 receives a signal showing U-phase current Iu detected in U-phase current detection circuit 43U of drive circuit 40 and a signal showing V-phase current Iv detected in V-phase current detection circuit 43V of drive circuit 40. Coordinate transformation unit 55 calculates W-phase current Iw from U-phase current Iu and V-phase current Iv. Then, coordinate transformation unit 55 performs coordinate transformation of U-phase current Iu, V-phase current Iv, and W-phase current Iw to thereby generate a γ-axis current Iγ and a δ-axis current Iδ. This is performed specifically according to the following procedure.

First, according to the following equation (1), the currents of three phases including a U-phase, a V-phase, and a W-phase are converted into two-phase currents of an α-axis current Iα and a β-axis current Iβ. This conversion is referred to as Clarke conversion.

$$\begin{pmatrix} I\alpha \\ I\beta \end{pmatrix} = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} Iu \\ Iv \\ Iw \end{pmatrix} \qquad (1)$$

Then, according to the following equation (2), α-axis current Iα and β-axis current Iβ are converted into a γ-axis current Iγ and a δ-axis current Iδ as a rotation coordinate system. This conversion is referred to as Park conversion. In the following equation (2), $\theta_M$ is an electrical angle in the magnetic pole direction estimated by magnetic pole position estimation unit 56, that is, an angle of the γ-axis from the U-phase coordinate axis.

$$\begin{pmatrix} I\gamma \\ I\delta \end{pmatrix} = \begin{pmatrix} \cos\theta_M & \sin\theta_M \\ -\sin\theta_M & \cos\theta_M \end{pmatrix} \begin{pmatrix} I\alpha \\ I\beta \end{pmatrix} \qquad (2)$$

Rotation speed control unit 51 receives a start command, a stop command and a target rotation angle speed ω* from high-order control circuit 60. Rotation speed control unit 51 determines a γ-axis current command value Iγ* and a δ-axis current command value Iδ* to brushless DC motor 30 based on target rotation angle speed ω* and a rotation angle speed $\omega_M$ of rotor 35 that is estimated by magnetic pole position estimation unit 56, for example, by proportional-integral (PI) control, proportional-integral-differential (PID) control or the like.

Current control unit 52 determines a γ-axis voltage command value Vγ* and a δ-axis voltage command value Vδ*, for example, by PI control, PID control or the like based on γ-axis current command value Iγ* and δ-axis current command value Iδ* that are supplied from rotation speed control unit 51, and γ-axis current Iγ and δ-axis current Iδ at present that are supplied from coordinate transformation unit 55.

Coordinate transformation unit 53 receives γ-axis voltage command value Vγ* and δ-axis voltage command value Vδ* from current control unit 52. Coordinate transformation unit 53 performs coordinate transformation of γ-axis voltage command value Vγ* and δ-axis voltage command value Vδ*, to thereby generate a U-phase voltage command value Vu*, a V-phase voltage command value Vv*, and a W-phase voltage command value Vw*. This is performed specifically according to the following procedure.

First, according to the following equation (3), γ-axis voltage command value Vγ* and δ-axis voltage command value Vδ* are converted into an α-axis voltage command value Vα* and a β-axis voltage command value Vβ*. This conversion is referred to as reverse Park conversion. In the following equation (3), $\theta_M$ is an electrical angle in the magnetic pole direction estimated by magnetic pole position estimation unit 56, that is, an angle of the γ-axis from the U-phase coordinate axis.

$$\begin{pmatrix} V\alpha^* \\ V\beta^* \end{pmatrix} = \begin{pmatrix} \cos\theta_M & -\sin\theta_M \\ \sin\theta_M & \cos\theta_M \end{pmatrix} \begin{pmatrix} V\gamma^* \\ V\delta^* \end{pmatrix} \qquad (3)$$

Then, according to the following equation (4), γ-axis voltage command value Vα* and β-axis voltage command value Vβ* are converted into U-phase voltage command value Vu*, V-phase voltage command value Vv*, and W-phase voltage command value Vw* of three phases. This conversion is referred to as reverse Clarke conversion. In addition, conversion of two phases of α and β into three phases of a U-phase, a V-phase, and a W-phase may be performed using space vector conversion in place of reverse Clarke conversion.

$$\begin{pmatrix} Vu^* \\ Vv^* \\ Vw^* \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} V\alpha^* \\ V\beta^* \end{pmatrix} \qquad (4)$$

Based on U-phase voltage command value Vu*, V-phase voltage command value Vv* and W-phase voltage command value Vw*, PWM conversion unit 54 generates inverter drive signals U+, U−, V+, V−, W+, and W− as PWM signals for driving the gates of transistors FU+, FU−, FV+, FV−, FW+, and FW−, respectively.

Magnetic pole position estimation unit 56 estimates rotation angle speed $\omega_M$ of rotor 35 at present and an electrical angle $\theta_M$ showing the magnetic pole position of rotor 35 at present based on γ-axis current Iγ and δ-axis current Iδ, and also on γ-axis voltage command value Vγ* and δ-axis voltage command value Vδ*. Specifically, magnetic pole position estimation unit 56 calculates rotation angle speed $\omega_M$ at which the γ-axis induced voltage is set at zero, and estimates electrical angle $\theta_M$ showing the magnetic pole position based on rotation angle speed $\omega_M$. Magnetic pole position estimation unit 56 outputs the estimated rotation angle speed $\delta_M$ to high-order control circuit 60 and also to rotation speed control unit 51. Furthermore, magnetic pole position estimation unit 56 outputs the information about electrical angle $\theta_M$ showing the estimated magnetic pole position to coordinate transformation units 53 and 55.

[Estimation of Initial Position of Magnetic Pole of Rotor in Rest State]

Figure 5:
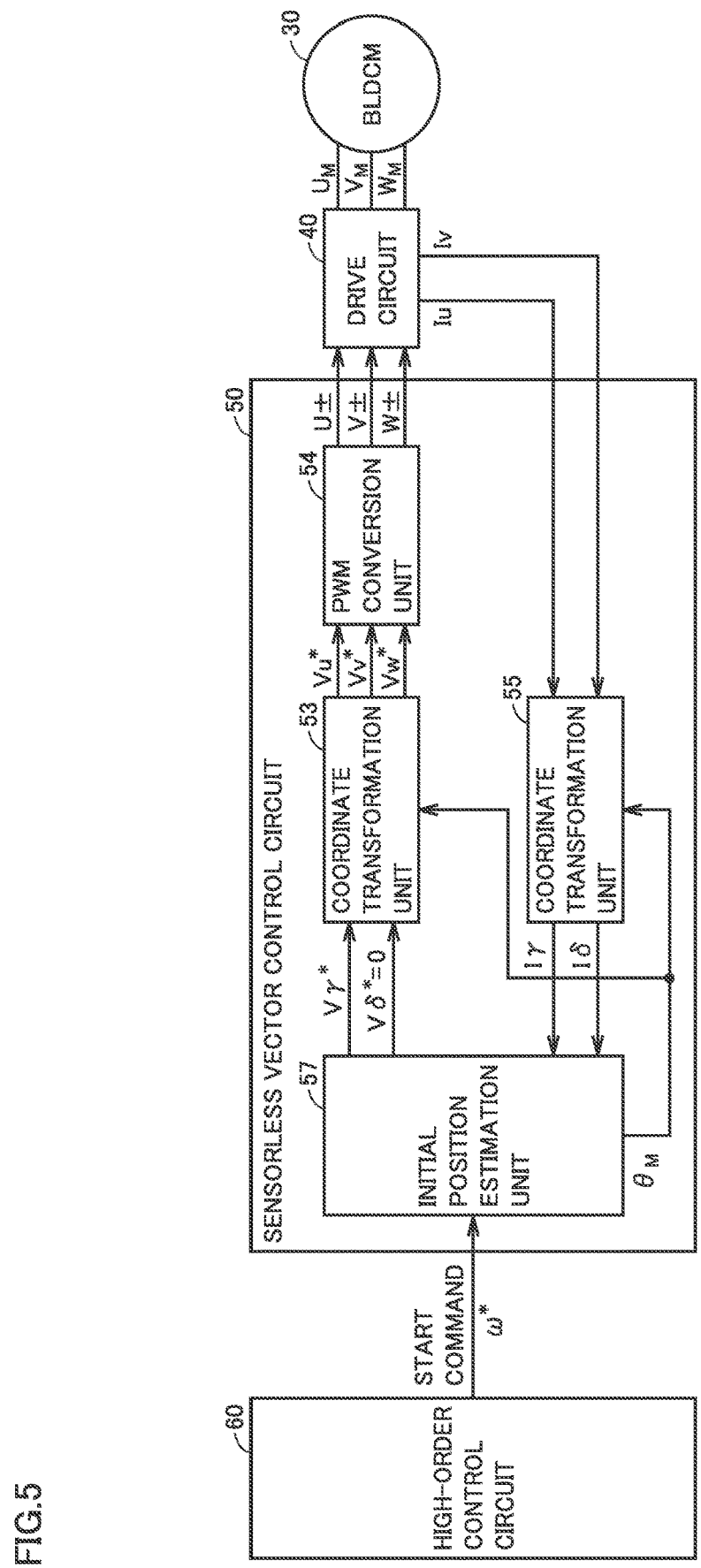
FIG. 5 is a functional block diagram illustrating a method of estimating an initial position of a magnetic pole of a rotor in the rest state.

FIG. 5 is a functional block diagram illustrating a method of estimating an initial position of a magnetic pole of a rotor in the rest state.

Since magnetic pole position estimation unit 56 in FIG. 4 utilizes the induced voltage generated in stator winding 31, it cannot be used while the rotor is stopped. Thus, in FIG. 5, an initial position estimation unit 57 for estimating the initial position of the magnetic pole of rotor 35 in an inductive sensing scheme is provided in place of magnetic pole position estimation unit 56.

In this case, in the inductive sensing scheme, a constant voltage is applied continuously or intermittently by PWM to stator winding 31 while sequentially changing a plurality of energization angles, so as to detect a change in the current flowing through stator winding 31 at each energization angle. In this case, the time period of energization to stator winding 31 and the magnitude of the voltage applied to stator winding 31 are set at levels at which rotor 35 does not rotate. However, when the energization time period is extremely short or the magnitude of the applied voltage is extremely small, the initial position of the magnetic pole cannot be detected, so that attention is required.

As described above, the method of estimating the initial position by inductive sensing utilizes the property of an effective inductance that slightly changes in accordance with the positional relation between the magnetic pole position of the rotor and the current magnetic field by the stator winding when the stator winding is applied with a voltage at a level not causing rotation of the rotor at a plurality of electrical angles. This change in inductance is based on the magnetic saturation phenomenon that remarkably occurs in the case of a d-axis current. Furthermore, in a case of an interior permanent magnet (IPM) motor having saliency by which the inductance in the q-axis direction becomes larger than the inductance in the d-axis direction, any change in inductance may be able to be detected even if no magnetic saturation occurs.

In order to specifically detect the direction of the magnetic pole of the rotor, in the present disclosure, the peak value of the γ-axis current within the energization time period is detected in the state where the energization time period at each energization angle and the command value for the applied voltage (specifically, the command value of the γ-axis voltage) are fixed. This peak value is corrected by the γ-axis residual current at the time when or immediately before voltage application is started. Then, the energization angle at which the peak value of the γ-axis current after correction attains a maximum value (that is, the energization angle at which the effective inductance attains a minimum value) is determined as approximately corresponding to the magnetic pole direction. Hereinafter, details will be described with reference to the accompanying drawings.

Referring to FIG. 5, sensorless vector control circuit 50 includes initial position estimation unit 57, coordinate transformation unit 53, PWM conversion unit 54, and coordinate transformation unit 55 as functions for estimating the initial position of the magnetic pole of rotor 35. In this way, the initial position of the magnetic pole of the rotor is estimated using a part of the function of vector control described with reference to FIG. 4. Hereinafter, the functions of these units will be described in further detail.

(1. Setting of γ-Axis Voltage Command Value, Energization Angle and Energization Time Period by Initial Position Estimation Unit)

Initial position estimation unit 57 sets the magnitude of γ-axis voltage command value Vγ*, electrical angle $\theta_M$ (also referred to as energization angle $\theta_M$) of each phase voltage to be applied to stator winding 31, and the energization time period. Initial position estimation unit 57 sets δ-axis voltage command value Vδ* at zero.

The magnitude of γ-axis voltage command value Vγ* and the energization time period are set such that γ-axis current Iγ with a sufficient SN ratio is obtained in the range not causing rotation of rotor 35. Electrical angle $\theta_M$ is set at a plurality of angles in the range from 0 degree to 360 degrees. For example, initial position estimation unit 57 changes electrical angle $\theta_M$ in a range from 0 degree to 360 degrees by 30 degrees.

(2. Coordinate Transformation Unit 53)

Coordinate transformation unit 53 performs coordinate transformation of γ-axis voltage command value Vγ* and δ-axis voltage command value Vδ* (=0), to thereby generate U-phase voltage command value Vu*, V-phase voltage command value Vv*, and W-phase voltage command value Vw*. This coordinate transformation is performed, for example, using reverse Park conversion represented by the above-mentioned equation (3) and reverse Clarke conversion represented by the above-mentioned equation (4).

Specifically, U-phase voltage command value Vu*, V-phase voltage command value Vv*, and W-phase voltage command value Vw* are represented by the following equation (5). In the following equation (5), the amplitude of the voltage command value is defined as $V_0$.

$$\begin{cases} Vu^* = V_0\cos\theta_M \\ Vv^* = V_0\cos(\theta_M - 120°) \\ Vw^* = V_0\cos(\theta_M - 240°) \end{cases} \quad (5)$$

Figure 6:
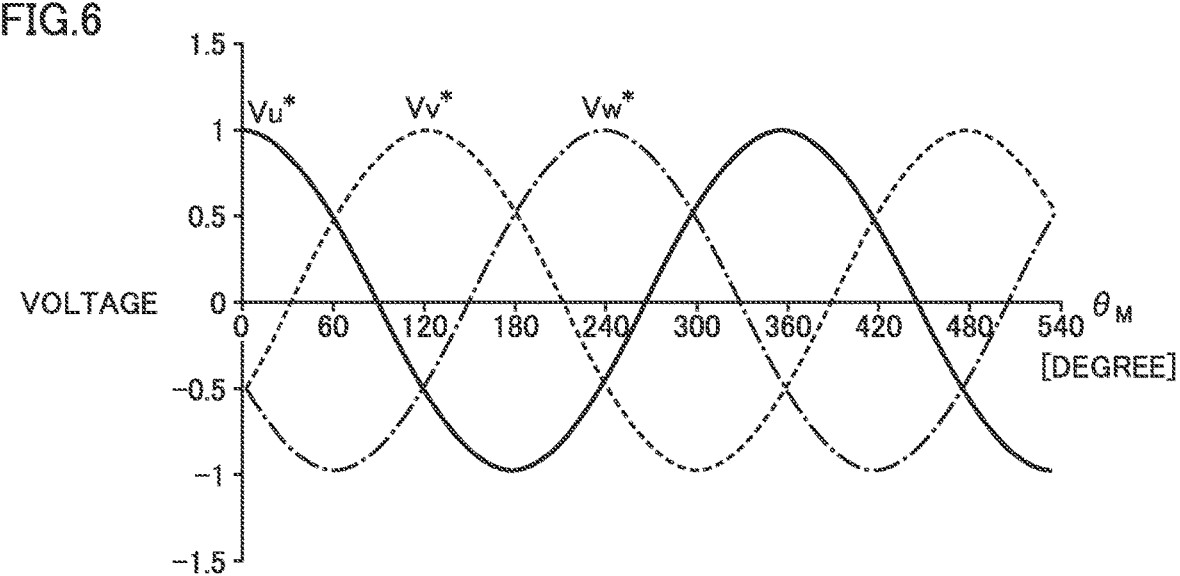
FIG. 6 is a diagram illustrating the relation between an electrical angle and each of a U-phase voltage command value, a V-phase voltage command value and a W-phase voltage command value.

FIG. 6 is a diagram illustrating the relation between the electrical angle and each of the U-phase voltage command value, the V-phase voltage command value and the W-phase voltage command value. In FIG. 6, amplitude $V_0$ of the voltage command value in the above-mentioned equation (5) is normalized to 1.

Referring to FIG. 6, U-phase voltage command value Vu*, V-phase voltage command value Vv*, and W-phase voltage command value Vw* shown in the above-mentioned equation (5) can be set with respect to $\theta_M$ that is arbitrarily set. For example, when $\theta_M$=0°, then. Vu*=1 and Vv*=Vw*=−0.5. When $\theta_M$=30°, then, Vu*=(√3)/2, Vv*=0, and Vw*=−(√3)/2.

(3. PWM Conversion Unit 54)

Again referring to FIG. 5, based on U-phase voltage command value Vu*, V-phase voltage command value Vv* and W-phase voltage command value Vw*, PWM conversion unit 54 generates inverter drive signals U+, U−, V+, V−, W+, and W− as PWM signals for driving the gates of transistors FU+, FU−, FV+, FV−, FW+, and FW−, respectively.

According to the generated inverter drive signals U+, U−, V+, V−, W+, and W−, drive circuit 40 supplies pulse-width-modulated U-phase voltage $U_M$, V-phase voltage $V_M$, and W-phase voltage $W_M$ to U-phase winding 31U, V-phase winding 31V, and W-phase winding 31W, respectively, of brushless DC motor 30. The pulse number of the inverter drive signal corresponds to the energization time period that has been set. U-phase current detection circuit 43U and V-phase current detection circuit 43V that are provided in drive circuit 40 detect U-phase current Iu and V-phase current Iv, respectively. The signals showing the detected U-phase current Iu and V-phase current Iv are input into coordinate transformation unit 55.

(4. Coordinate Transformation Unit 55)

Coordinate transformation unit 55 calculates W-phase current Iw based on U-phase current Iu and V-phase current Iv. Then, coordinate transformation unit 55 performs coordinate transformation of U-phase current Iu, V-phase current Iv, and W-phase current Iw, to thereby generate γ-axis current Iγ and δ-axis current Iδ. This coordinate transformation is performed using Clarke conversion in the above-mentioned equation (1) and Park conversion in the above-mentioned equation (2).

In addition, if there is no difference in electrical property and magnetic property among the U-phase, the V-phase and the W-phase, and also if there is no influence of the permanent magnet of rotor 35, the ratio among U-phase current Iu. V-phase current Iv, and W-phase current Iw should be equal to the ratio among voltage command values Vu*, Vv*, and Vw*. Accordingly, in this virtual case, δ-axis current Iδ is zero irrespective of the energization angle while γ-axis current Iγ is a fixed value irrespective of the energization angle.

Figure 7:
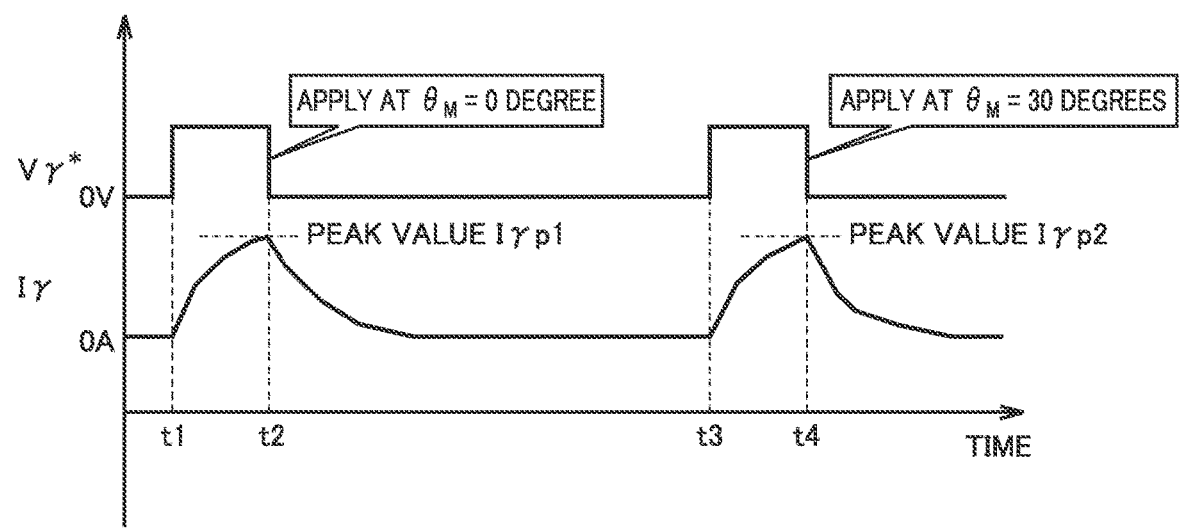
FIG. 7 is a timing chart schematically illustrating an example of the relation between a γ-axis voltage command value and the detected γ-axis current.

FIG. 7 is a timing chart schematically illustrating an example of the relation between γ-axis voltage command value Vγ* and the detected γ-axis current. It should be noted that the energization timing shown in FIG. 7 shows a commonly applied case.

Referring to FIG. 7, first, initial position estimation unit 57 in FIG. 5 sets energization angle $\theta_M$ at zero degree in a time period from a time point t1 to a time point t2, and also sets γ-axis voltage command value Vγ* at a prescribed set value. Thereby, pulse-width-modulated U-phase voltage $U_M$, V-phase voltage $V_M$ and W-phase voltage $W_M$ are applied to U-phase winding 31U, V-phase winding 31V, and W-phase winding 31W, respectively, of the stator. As a result, in a time period from time point t1 to time point t2, γ-axis current Iγ gradually increases from 0A and reaches a peak value Iγp1 at time point t2. At and after time point t2, voltage application to stator winding 31 is stopped, so that γ-axis current Iγ gradually decreases. During a time period until a tune point t3 at which a voltage is applied to stator winding 31 next time, the values of U-phase current In, V-phase current Iv, and W-phase current Iw return to zero, with the result that the value of γ-axis current Iγ also returns to zero.

Then, in a time period from time point t3 to a time point t4, initial position estimation unit 57 sets energization angle $\theta_M$ at 30 degrees and also sets γ-axis voltage command value Vγ* at the same set value as the previous value. As a result, γ-axis current Iγ gradually increases from 0A in a time period from time point t3 to time point t4, and reaches a peak value Iγp2 at time point t4. At and after time point t4, voltage application to stator winding 31 is stopped, so that γ-axis current Iγ gradually decreases.

Subsequently, in a similar manner, the set angle of energization angle $\theta_M$ is changed. Then, at the changed energization angle $\theta_M$, a constant voltage subjected to pulse width modulation is applied to stator winding 31. In this case, γ-axis voltage command value Vγ* is the same at each energization angle while the energization time period is also the same at each energization angle. Then, the peak value of γ-axis current Iγ at the end of voltage application is detected.

(5. Estimation of Magnetic Pole Position of Rotor by Initial Position Estimation Unit—In Case of No Residual Current)

Again referring to FIG. 5, initial position estimation unit 57 estimates the position of the magnetic pole of rotor 35 based on the peak value of γ-axis current Iγ obtained with respect to each of the plurality of energization angles $\theta_M$. In the case where energization is conducted at the next energization angle after waiting for the residual current to return to zero as described above, energization angle $\theta_M$ at which the maximum value of the peak value of γ-axis current Iγ is obtained is ideally approximately equivalent to a position θ of the magnetic pole of rotor 35.

Figure 8A:
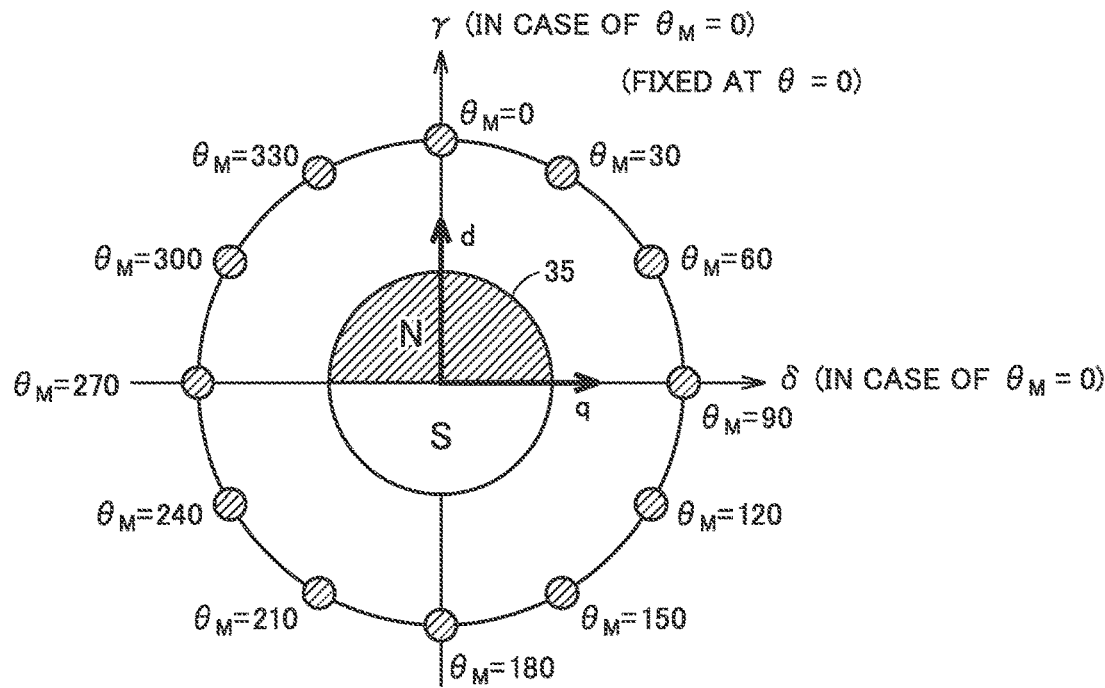
FIGS. 8A and 8B are diagrams each illustrating the relation between: a peak value of the γ-axis current; and the relative positional relation between the magnetic pole position of the rotor and an energization angle.
Figure 8B:
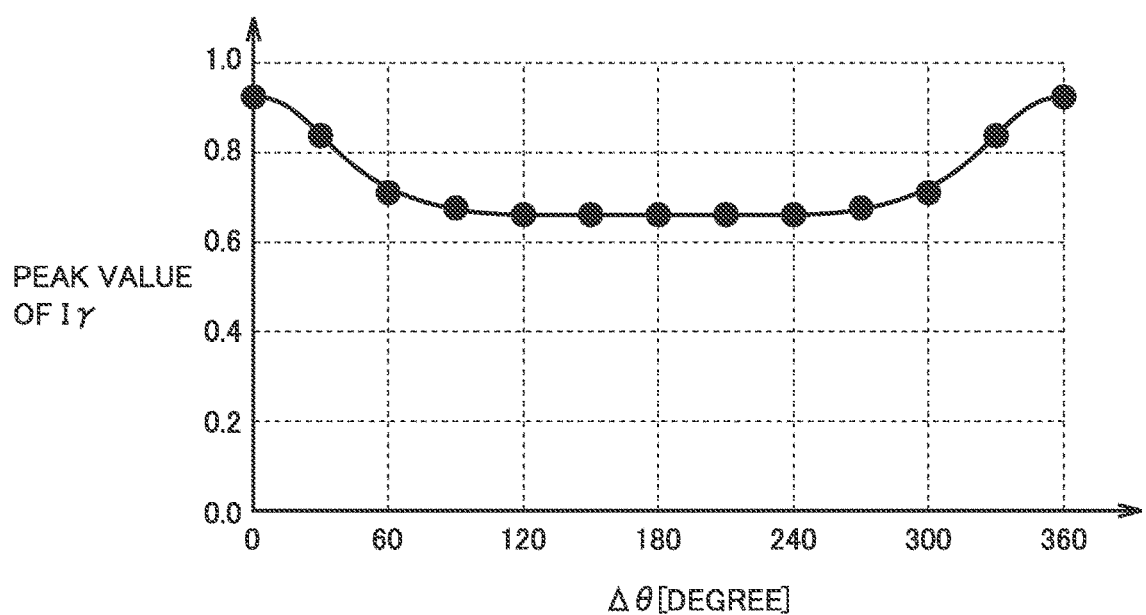

FIGS. 8A and 8B are diagrams each illustrating the relation between: the peak value of the γ-axis current; and the relative positional relation between the magnetic pole position of the rotor and the energization angle. First, referring to FIG. 8A, the relative positional relation between magnetic pole position 0 of rotor 35 and energization angle $\theta_M$ will be described below.

In the case of FIG. 8A, magnetic pole position 0 of rotor 35 is fixed at 0°. Accordingly, the d-axis is set in the direction of an electrical angle 0° while the q-axis is set in the direction of an electrical angle 90°. On the other hand, energization angle $\theta_M$ changes from 0° to 360° by 30°. FIG. 8A shows a γ-axis and a δ-axis in the case where energization angle $\theta_M$ is 0°. In this case, Δθ=0°.

Then, referring to FIG. 8B, the relation between the peak value of a γ-axis current Iγ and an angle difference Δθ between magnetic pole position 0 and energization angle $\theta_M$ will be described. In FIG. 8B, the horizontal axis shows angle difference Δθ while the vertical axis shows a peak value of γ-axis current Iγ. The unit of the vertical axis is an arbitrary unit.

As shown in FIG. 8B, ideally, when angle difference Δθ between magnetic pole position θ and energization angle $\theta_M$ is 0°, that is, when magnetic pole position θ is equal to energization angle $\theta_M$ (the case where $\theta=\theta_M=020$ in FIG. 8A), the peak value of γ-axis current Iγ shows a maximum value.

[Positive/Negative State of δ-Axis Current]

In the following, the signs of γ-axis current Iγ will be additionally explained. The following is an explanation with reference to FIGS. 9A and 9B showing that γ-axis current Iγ may be not only a positive value but also a negative value in accordance with energization angle $\theta_M$.

Figures 9A, 9B:
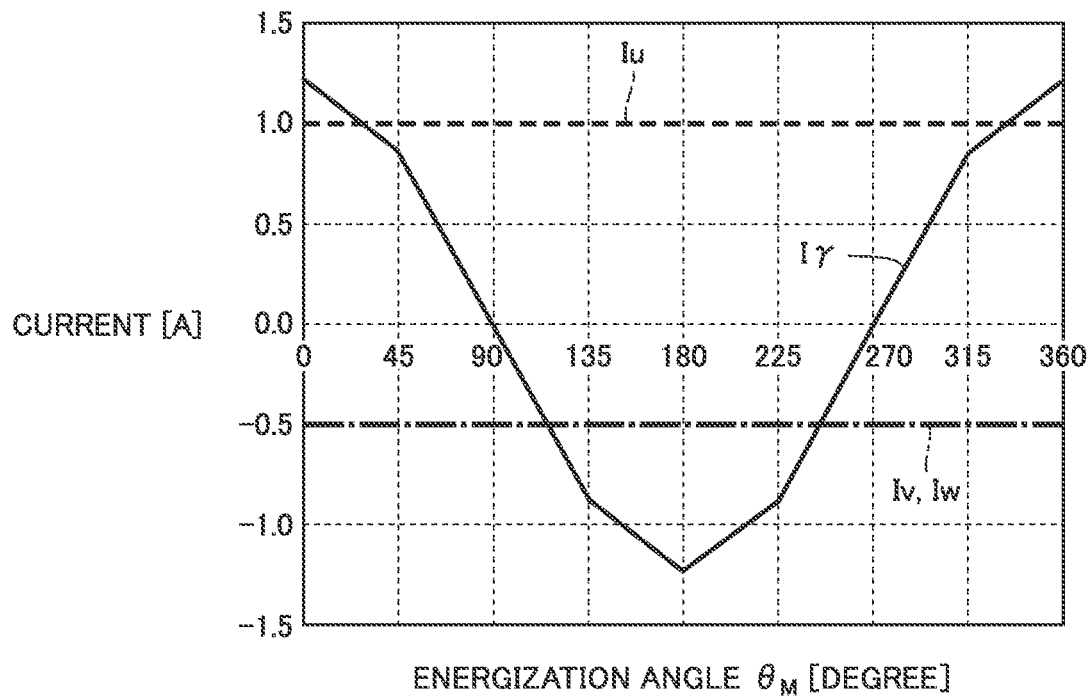
FIGS. 9A and 9B are diagrams each illustrating signs of the γ-axis current.

FIGS. 9A and 9B are diagrams each illustrating the signs of the γ-axis current. FIG. 9A shows examples of numerical values in tabular form while FIG. 9B shows examples of numerical values shown in FIG. 9A in a graph form The horizontal axis in FIG. 9B shows energization angle $\theta_M$. The vertical axis in FIG. 9A shows detection values of U-phase current In, V-phase current Iv, W-phase current Iw, and γ-axis current Iγ.

Referring to FIGS. 9A and 9B, the detection value of U-phase current Iu detected in U-phase current detection circuit 43U in FIG. 1 is 1.0 [A] while the detection value of V-phase current Iv detected in V-phase current detection circuit 43V is −0.5 [A]. In this case, the value of W-phase current Iw is calculated as −0.5 [A].

Coordinate transformation unit 55 provided in sensorless vector control circuit 50 in FIG. 5 performs coordinate transformation of the detection values of U-pulse current Iu, V-phase current Iv, and W-phase current Iw, to thereby calculate γ-axis current Iγ and δ-axis current Iδ.

Specifically, coordinate transformation unit 55 first calculates au α-axis current Iα and a β-axis current Iβ by Clarke conversion shown in the above-mentioned equation (1). As shown in FIG. 9A, α-axis current Iα is calculated as 1.225 [A] while β-axis current Iβ is calculated as 0.000 [A].

Then, coordinate transformation unit 55 subjects α-axis current Iα and β-axis current Iβ to Park conversion shown in the above-mentioned equation (2) to thereby calculate γ-axis current Iγ . As shown in FIGS. 9A and 9B, the detection value of γ-axis current Iγ varies according to energization angle $θ_M$. In the examples of numerical values shown in FIGS. 9A and 9B, γ-axis current Iγ becomes negative when energization angle $θ_M$ is greater than 90° and smaller than 270°.

In this way, γ-axis current Iγ can be not only a positive value but also a negative value in accordance with energization angle $θ_M$. Accordingly, each of an γ-axis residual current Iγ0 and a γ-axis peak current Iγp can also be not only a positive value but also a negative value. Also, when γ-axis current Iγ is negative, the peak value of γ-axis current Iγ indicates a value (negative value) obtained when γ-axis current Iγ reaches a minimum value within the energization time period.

[Method of Estimating Peak Value of γ-Axis Current in Case of Existence of Residual Current (I)]

In the example in FIG. 7, γ-axis current Iγ returns completely to zero in a time period from time point t2 at which voltage application to stator winding 31 at energization angle $θ_M$=0° is completed until time point t3 at which a voltage is applied to stator winding 31 at the next energization angle $θ_M$=30°. The following is an explanation about the case where a residual current exists (that is, not returns to zero) when voltage application at the next energization angle $θ_M$ is started.

FIG. 10 is a timing chart schematically illustrating an example of a waveform of the γ-axis current in the case where a residual current exists. The timing chart in FIG. 10 corresponds to the timing chart in FIG. 7.

Referring to FIG. 10, in a time period from time point t1 to time point t2, initial position estimation unit 57 in FIG. 5 sets energization angle $θ_M$ at zero degree and also sets γ-axis voltage command value Vγ* at a prescribed set value. Thereby, the pulse-width-modulated U-phase voltage $U_M$, V-phase voltage $V_M$ and W-phase voltage $W_M$ are applied to U-phase winding 31U, V-phase winding 31V, and W-phase winding 31W, respectively, of the stator. As a result, γ-axis current Iγ gradually increases from 0A in a time period from time point t1 to time point t2, and reaches a peak value Iγp1 at time point t2. At and after time point t2, voltage application to stator winding 31 is stopped, so that γ-axis current Iγ gradually decreases. Unlike the case in FIG. 7, FIG. 10 shows that the γ-axis current of Iγ0 remains at time point 3 at which a voltage is applied to stator winding 31 next time.

In a time period from time point t3 to time point t4, initial position estimation unit 57 sets energization angle $θ_M$ at 30 degrees and also sets γ-axis voltage command value Vγ* at the same set value as the previous value. As a result, γ-axis current Iγ increases gradually from Iγ0 in a time period from time point t3 to time point t4, and then reaches peak value Iγp2 at time point t4. At and after time point t4, voltage application to stator winding 31 is stopped, so that γ-axis current Iγ gradually decreases.

Thus, when energization angle $θ_M$ is 30 degrees, the true peak value of the γ-axis current can be calculated as a γ-axis current change amount ΔIγ that is obtained by subtracting residual current Iγ0 from the measured peak value Iγp2 with respect to γ-axis residual current Iγ0. In other words, by subtracting γ-axis residual current Iγ0 as a correction amount from peak value Iγp2 of the γ current before correction, the peak value of the γ-axis current (that is, ΔIγ) after correction can be calculated. In addition, the timing at which γ-axis residual current Iγ0 is detected can be set at each energization angle simultaneously with or immediately before the start of voltage application to the stator winding.

Subsequently, in a similar manner, the set angle of energization angle $θ_M$ is changed and the pulse-width-modulated voltage is applied to each phase of suitor winding 31 at the changed energization angle $θ_M$. In this case, γ-axis voltage command value Vγ* shows the same value at each energization angle, and the time at which a pulse voltage is applied is also the same at each energization angle. At each energization angle, the γ-axis current obtained simultaneously with or immediately before the start of voltage application is measured as a residual current Iγ0. Furthermore, peak value Iγp of the γ-axis current at the end of voltage application is detected. Then, a γ-axis current change amount ΔIγ obtained by subtracting residual current Iγ0 from peak value Iγp of the γ-axis current is stored in a memory as a peak value of the γ-axis current obtained after correction of the γ-axis current corresponding to this energization angle $θ_M$.

Eventually, energization angle $θ_M$ in the case of the largest γ-axis current change amount ΔIγ corresponds to an initial position 0 of the magnetic pole of the rotor.

In addition, in the case where the sign of γ-axis current Iγ is a minus sign, its peak value Iγp indicates the value at the time when the absolute value of γ-axis current Iγ reaches a maximum value. Thus, the sign of γ-axis current Iγ may be a minus sign and the sign of residual current Iγ0 may also be a minus sign. In any case, by subtracting residual current Iγ0 as a correction amount from the peak value of the detected γ-axis current, the peak value of the γ-axis current after correction (that is, γ-axis current change amount ΔIγ) is obtained. Then, energization angle $θ_M$ obtained when the absolute value of the peak value of the γ-axis current after correction is a maximum value corresponds to initial position 0 of the magnetic pole of the rotor.

[Procedure of Estimating Initial Position of Magnetic Pole of Rotor]

Figure 11:
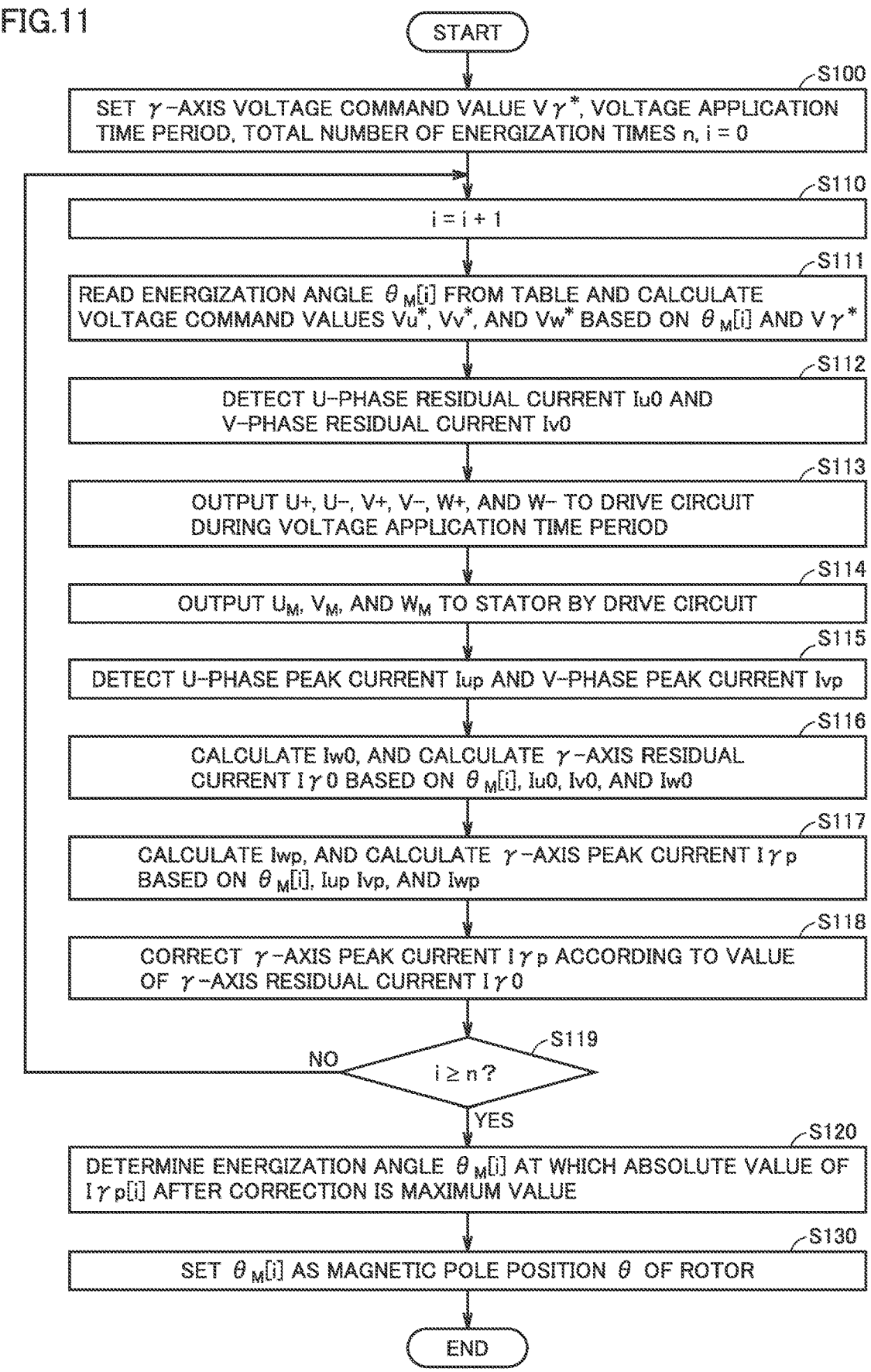
FIG. 11 is a flowchart illustrating the procedure of estimating the initial position of the magnetic pole of the rotor in the case where the residual current is taken into consideration.

FIG. 11 is a flowchart illustrating the procedure of estimating the initial position of the magnetic pole of the rotor in the case where the residual current is taken into consideration. The following is a summarization regarding the above description mainly with reference to FIGS. 5 and 11.

In step S100 in FIG. 11, γ-axis voltage command value Vγ*, the time period of applying a voltage to stator winding 31 at each energization angle $θ_M$ (that is, energization time period), and the total number of energization times n are set. For example, when a voltage is applied to stator winding 31 at each 30 degrees, the total number of energization times n is set at 12. The parameter at which the number of energization times is counted is defined as i. The initial value of i is zero. In addition, an energization angle $θ_M$[i] corresponding to the number of energization times i is stored in advance, for example, in a memory in tabular form.

FIG. 12 is a diagram showing an example of a table storing energization angles as well as cosine values and sine values that correspond to their respective energization angles. As shown in FIG. 12, energization angle $θ_M$[i] mid corresponding to parameter i and the cosine value and the sine value at this energization angle $θ_M$[i] are stored in advance in the memory in tabular form.

Parameter i shows the sequential order in which a pulse voltage is applied. In other words, after a pulse voltage is first applied to stator winding 31 at energization angle $θ_M$=0°, a pulse voltage is then applied to stator winding 31 at energization angle $θ_M$=180°. Then, a pulse voltage is applied to stator winding 31 at energization angle $θ_M$=30°. The reason why the energization angle is changed by 180° or by an angle closer to 180° is for the purpose of preventing a torque from being applied to the rotor in the same direction, that is, for the purpose of preventing the rotor from rotating.

Again referring to FIG. 11, in the next step S110, initial position estimation unit 57 increments parameter i showing the number of energization times by one.

In the next step S111, from the table, coordinate transformation unit 53 reads energization angle $\theta_M[i]$ corresponding to parameter i, and the cosine value and the sine value at this energization angle $\theta_M[i]$. Coordinate transformation unit 53 calculates U-phase voltage command value Vu*, V-phase voltage command value Vv*, and W-phase voltage command value Vw* based on energization angle $\theta_M$ that has been read and γ-axis voltage command value Vγ* that has been set in advance.

In the next step S112, U-phase current detection circuit 43U and V-phase current detection circuit 43V in FIG. 1 detect U-phase residual current Iu0 and V-phase residual current Iv0, respectively. The residual current is detected at the time when energization is started in step S113 or immediately before energization is started in step S113.

In the next step S113, PWM conversion unit 54 outputs inverter drive signals U+, U−, V+, V−, W+, and W− as PWM signals to drive circuit 40 during the voltage application time period that is set in advance.

In the next step S114, based on inverter drive signals U+, U−, V+, V−, W+, and W−, inverter circuit 41 of drive circuit 40 applies the pulse-width-modulated U-phase voltage $U_M$, V-phase voltage $V_M$, and W-phase voltage $W_M$ to each phase of stator winding 31 of brushless DC motor 30.

In the next step S115, U-phase current detection circuit 43U and V-phase current detection circuit 43V in FIG. 1 detect a U-phase peak current Iup and a V-phase peak current Ivp, respectively, within an energization time period. For example, U-phase current detection circuit 43U and V-phase current detection circuit 43V in FIG. 1 may detect U-phase current Iu and V-phase current Iv, respectively, within the energization time period in a predetermined sampling period, and then, initial position estimation unit 57 may specify a peak value based on the detected U-phase current Iu and V-phase current Iv. Alternatively, the value of U-phase current Iu and the value of V-phase current Iv at the end of the energization time period may be defined as U-phase peak current Iup and V-phase peak current Ivp, respectively.

In the next step S116, coordinate transformation unit 55 calculates a W-phase residual current Iw0 based on U-phase residual current Iu0 and V-phase residual current Iv0 according to Iw0=−Iu0−Iv0. Based on energization angle $\theta_M[i]$ selected in step S111, coordinate transformation unit 55 calculates residual current Iγ0 of the γ-axis and residual current Iδ0 of the δ-axis from residual currents Iu0, Iv0, and Iw0 in each phase by coordinate transformation.

In the next step S117, coordinate transformation unit 55 calculates a W-phase peak current Iwp from U-phase peak current Iup and V-phase peak current Ivp according to Iwp=−Iup−Ivp in the same manner as in step S116. Based on energization angle $\theta_M[i]$ selected in step S111, coordinate transformation unit 55 calculates peak current Iγp of the γ-axis and peak current Iδp of the δ-axis from peak currents Iup Ivp, and Iwp in each phase by coordinate transformation. It should be noted that either of steps S116 and S117 may be performed first, or steps S116 and S117 may be concurrently performed. Also, step S116 may be performed at any timing as long as step S112 has already been performed.

In the next step S118, initial position estimation unit 57 corrects peak value Iγp of the γ-axis current according to the value of γ-axis residual current Iγ0 at each energization angle. In the first embodiment, initial position estimation unit 57 calculates, as a correction value of γ-axis current Iγ, a γ-axis current change amount ΔIγ[i] obtained by subtracting γ-axis residual current Iγ0 from γ-axis peak current Iγp at each energization angle. Specifically, γ-axis current change amount ΔIγ[i] is calculated by the following equation.

$$\Delta I\gamma[i] = I\gamma p - I\gamma 0 \qquad (6)$$

More generally, it can be considered that initial position estimation unit 57 corrects peak value Iγp of the γ-axis current by subtracting the correction amount having the same sign as that of γ-axis residual current Iγ0 from the detected peak value Iγp of the γ-axis current at each energization angle. In the first embodiment, this correction amount is equal to γ-axis residual current Iγ0. In order to further accurately estimate the initial position of the magnetic pole, the second embodiment shows a formula for calculating the correction amount based on peak value Iγp of the γ-axis current and the detection value of γ-axis residual current Iγ0.

The above-described steps S110 to S118 are repeated by the total number of energization times n (that is, until the determination equation of i≥n reaches YES in step S119).

In the next step S120, initial position estimation unit 57 calculates the maximum value of the absolute value of γ-axis current change amount ΔIγ[i] at each energization angle $\theta_M[i]$ calculated in the above-described step S116. Then in step S130, initial position estimation unit 57 sets, as initial position 0 of the magnetic pole of the rotor, energization angle $\theta_M[i]$ at which the absolute value of γ-axis current change amount ΔIγ[i] is a maximum value.

[Effect of First Embodiment]

According to motor controller 70 in the first embodiment, the initial position of the magnetic pole of the rotor is estimated in an inductive sensing scheme. Specifically, in the case where drive circuit 40 applies a voltage at the first energization angle arbitrarily selected from among a plurality of energization angles and subsequently applies a voltage at the second energization angle based on the control of initial position estimation unit 57 of sensorless vector control circuit 50, drive circuit 40 applies an AC voltage to stator winding 31 at the second energization angle after it applies an AC voltage to stator winding 31 at the first energization angle and before the residual current in stator winding 31 returns to zero. In this case, at each energization angle, with reference to the residual current remaining immediately before a voltage is applied to stator winding 31 or at the time when voltage application to stator winding 31 is started, initial position estimation unit 57 detects, as a correction value of γ-axis peak current Iγp, change amount ΔIγ of the current flowing through stator winding 31 that is generated by application of an AC voltage in a prescribed energization time period. Initial position estimation unit 57 estimates the initial position of the magnetic pole of the rotor based on the peak value of γ-axis peak current Iγp after correction. This allows the initial position of the rotor to be estimated accurately in a short time period.

Second Embodiment

The first embodiment is predicated on the assumption that γ-axis current change amount ΔIγ obtained as a result of calculation as a difference between γ-axis peak current Iγp and γ-axis residual current Iγ0 should be equal to γ-axis peak current Iγp in the case where γ-axis residual current Iγ0 is zero. However, as a result of further detailed studies by the inventors of the present application, they found that γ-axis current change amount ΔIγ changed depending on the magnitude of γ-axis residual current Iγ0.

In consideration of the above, the second embodiment presents correction equations and correction tables, based on which the peak value of the γ-axis current is corrected according to γ-axis residual current Iγ0 at each energization angle in order to further accurately detect the initial position of the magnetic pole of the rotor. Thus, in the second embodiment, the specific method of correcting peak value Iγp of the γ-axis current is modified in step S118 in the flowchart in FIG. 11. Since other points in the second embodiment are the same as those in the first embodiment, the description thereof will not be repeated.

[Method of Estimating Peak Value of γ-Axis Current in Case of Existence of Residual Current (II)]

FIGS. 13A and 13B are schematic timing charts each showing an example of the relation between the value of the γ-axis residual current and the peak value of the γ-axis current. FIG. 13A shows a temporal change in γ-axis voltage command value Vγ* while FIG. 13B shows a temporal change in γ-axis current Iγ corresponding to that in FIG. 13A. It is assumed that there is no influence of the permanent magnet of the rotor.

FIG. 13B shows a graph of γ-axis current Iγ in which the γ-axis residual currents of different values are shown in a superimposed manner. The graph of γ-axis current Ia shows the case where γ-axis residual current Iγ0 is zero. The graph of γ-axis current Ib shows the case where γ-axis residual current Iγ0 is positive. The graph of γ-axis current Ic shows the case where γ-axis residual current Iγ0 is negative. A current change amount as a difference between the peak value of γ-axis current Iα and the γ-axis residual current (=0) is defined as ΔIa. A current change amount as a difference between the peak value of γ-axis current Ib and the γ-axis residual current (>0) is defined as ΔIb. A current change amount as a difference between the peak value of γ-axis current Ic and the γ-axis residual current (<0) is defined as ΔIc.

Referring to FIGS. 13A and 13B, the pulse-width-modulated voltage is applied to stator winding 31 of brushless DC motor 30 in a time period from time point t3 to time point t4, and accordingly, γ-axis current Iγ gradually increases. The manner of change in γ-axis current Iγ basically shows the first order lag characteristics based on the inductance and the resistance value of stator winding 31. In order to prevent rotation of the rotor, energization is ended long before the current asymptotic value determined by the applied voltage and the resistance value becomes substantially equal to γ-axis current Iγ. It should be noted that the above-mentioned current asymptotic value is a fixed value irrespective of γ-axis residual current Iγ0 as an initial value.

When the voltage application time period is relatively short, current change amounts ΔIa, ΔIb, and ΔIc can be approximated so as to be equal to each other as described in the first embodiment. Thus, the peak value of the γ-axis current can be corrected based on the current change amounts.

However, more accurately, the first order lag characteristics are taken into consideration, to thereby establish the following relation.

$$\Delta Ib < \Delta Ia < \Delta Ic \qquad (7)$$

Therefore, the correction amount of the peak value of the γ-axis current needs to be changed according to the value of the γ-axis residual current.

In this case, assuming that the peak value of the γ-axis current is defined as Iγp, and the correction amount is defined as Ca, a peak value Iγp_c after correction is represented by the following equation.

$$I\gamma p\_c = I\gamma p - Ca \qquad (8)$$

In this case, correction amount Ca shows a value having the same sign as that of the γ-axis residual current, and shows zero when the γ-axis residual current is zero. In other words, when the γ-axis residual current is zero, peak value Iγp of the γ-axis current is defined as a true value. Furthermore, when the γ-axis residual current is negative, correction amount Ca becomes a negative value. In this case, peak value Iγp_c of the γ-axis current after correction shows a value obtained by adding the absolute value of correction amount Ca to peak value Iγp of the γ-axis current before correction.

In the first embodiment, correction amount Ca in the above-mentioned equation (8) is assumed to be equal to a γ-axis residual current Iγ0. More accurately, however, the absolute value of correction amount Ca is smaller than the absolute value of the γ-axis residual current. In other words, in the case where γ-axis residual current Iγ0 and peak value Iγp of the γ-axis current have the same sign, the absolute value of peak value Iγp_c of the γ-axis current after correction is larger than the absolute value of the current change amount (ΔIγ=Iγp−Iγ0). In contrast, when γ-axis residual current Iγ0 and peak value Iγp of the γ-axis current have different signs, the absolute value of peak value Iγp_c of the γ-axis current after correction is smaller than the absolute value of the current change amount (ΔIγ=Iγp−Iγ0). Furthermore, the absolute value of correction amount Ca becomes larger as the absolute value of the γ-axis residual current becomes larger.

As a result of additional particular studies, the inventors of the present application further found that correction amount Ca in the above-mentioned equation (8) can be approximated by the product of: the value of γ-axis residual current Iγ0, the absolute value of the detected peak value Iγp of the γ-axis current; and a positive proportionality coefficient K1. Thus, peak value Iγp_c of the γ-axis current after correction is represented by the following equation.

$$I\gamma p\_c = I\gamma p - Ca = I\gamma p - K1 \cdot I\gamma 0 \cdot |I\gamma p| \qquad (9)$$

Proportionality coefficient K1 in the above-mentioned equation varies according to motor and can be calculated by experiments.

Figures 14A, 14B:
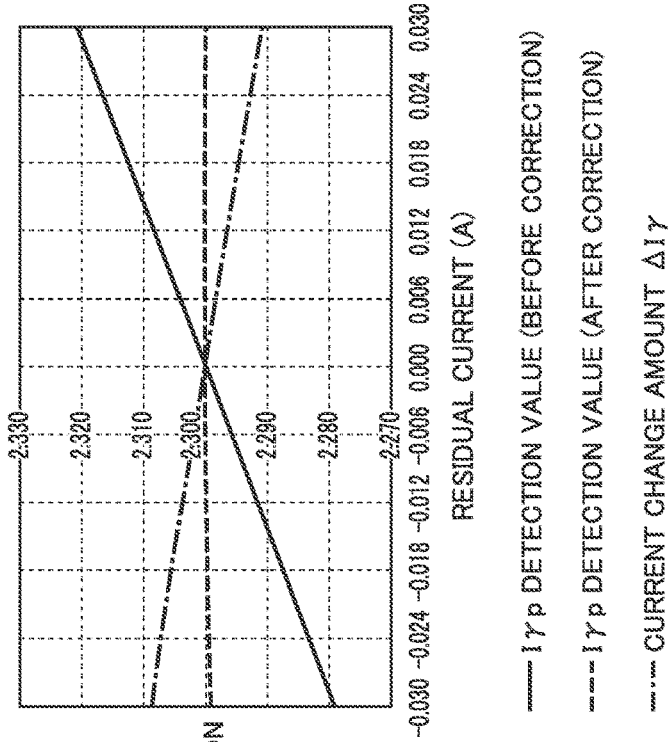
FIGS. 14A and 14B are diagrams each showing an example of the experimentally obtained relation between the detection value of a γ-axis peak current and the γ-axis residual current.

FIGS. 14A and 14B are diagrams each showing an example of the experimentally obtained relation between the detection value of the γ-axis peak current and the γ-axis residual current. FIG. 14A shows experiment results in tabular form while FIG. 14B shows experiment results in a graph form. In FIG. 14B, a solid line shows detected peak value Iγp of the γ-axis current, and a broken line shows peak value Iγp_c of the γ-axis current that has been corrected according to the above-mentioned equation (9). Correction coefficient K1 in the equation (9) was set at 0.3. Also, an alternate long and short dashed line shows γ-axis current change amount ΔIγ as a difference between peak value Iγp of the γ-axis current before correction and γ-axis residual current Iγ0.

As shown in FIG. 14B, deviation of γ-axis current change amount ΔIγ (that is, the γ-axis current peak value after correction in the first embodiment) from the true value (that is, the γ-axis current peak value in the case where γ-axis residual current Iγ0 is zero) is larger as the absolute value of γ-axis residual current Iγ0 becomes larger. On the other hand, it turns out that peak value Iγp_c of the γ-axis current corrected according to the correction equation in the above-mentioned equation (9) is approximately equal to the true value irrespective of the value of γ-axis residual current Iγ0.

[Method of Estimating Peak Value of γ-Axis Current in Case of Existence of Residual Current (III)]

In FIGS. 14A and 14B described above, the detected peak value Iγp of the γ-axis current is corrected at each energization angle using the correction equation (9), but can however be corrected also using a correction table. The correction table is created based on the experiment and stored in a memory in advance.

FIG. 15 is a diagram showing an example of the correction table for correcting the γ-axis current change amount in accordance with the γ-axis residual current. The correction table in FIG. 15 is based on an example of the measured values shown in FIGS. 14A and 14B. The portion surrounded by a thick solid line in FIG. 15 corresponds to the correction table. The correction table includes correction coefficients in the range of the γ-axis residual currents. FIG. 15 collectively shows an example of specific detection values of peak values Iγp of γ-axis currents, and the values obtained after correction.

For example, when the absolute value of peak value Iγp of the γ-axis current is smaller than 0.003 [A], initial position estimation unit 57 in FIG. 5 does not correct the measured value of peak value Iγp of the γ-axis current assuming that a correction coefficient is 1. When γ-axis residual current Iγ0 is equal to or greater than 0.01 [A], initial position estimation unit 57 multiplies peak value Iγp of the γ-axis current before correction by a correction coefficient of 0.97, thereby calculating peak value Iγp_c of the γ-axis current after correction. When γ-axis residual current Iγ0 is equal to or less than −0.01 [A], initial position estimation unit 57 multiplies peak value Iγp of the γ-axis current before correction by a correction coefficient of 1.002, thereby calculating peak value Iγp_c of the γ-axis current after correction.

[Effect of Second Embodiment]

According to a motor controller 70 in the second embodiment, detected peak value Iγp of the γ-axis current is corrected according to γ-axis residual current Iγ0. This correction is made using the above-mentioned correction equation (9) or the correction table in FIG. 15. Initial position estimation unit 57 estimates the initial position of the magnetic pole of the rotor based on peak value Iγp_c of the γ-axis current after correction, which is obtained at each energization angle. Thereby, the initial position of the magnetic pole of the rotor can be still more accurately detected.

Third Embodiment

The third embodiment will be described with reference to an example in which motor controller 70 having been described in the first and second embodiments is used for controlling the motor for driving a paper feed roller in an image forming apparatus. The motor for driving the paper feed roller is repeatedly started, rotated and stopped in a short time period. Thus, it is desirable that the time period required to estimate the magnetic pole position of the roller performed before start-up can be shortened as much as possible. The following is an explanation with reference to the accompanying drawings.

[Configuration Example of Image Forming Apparatus]

Figure 16:
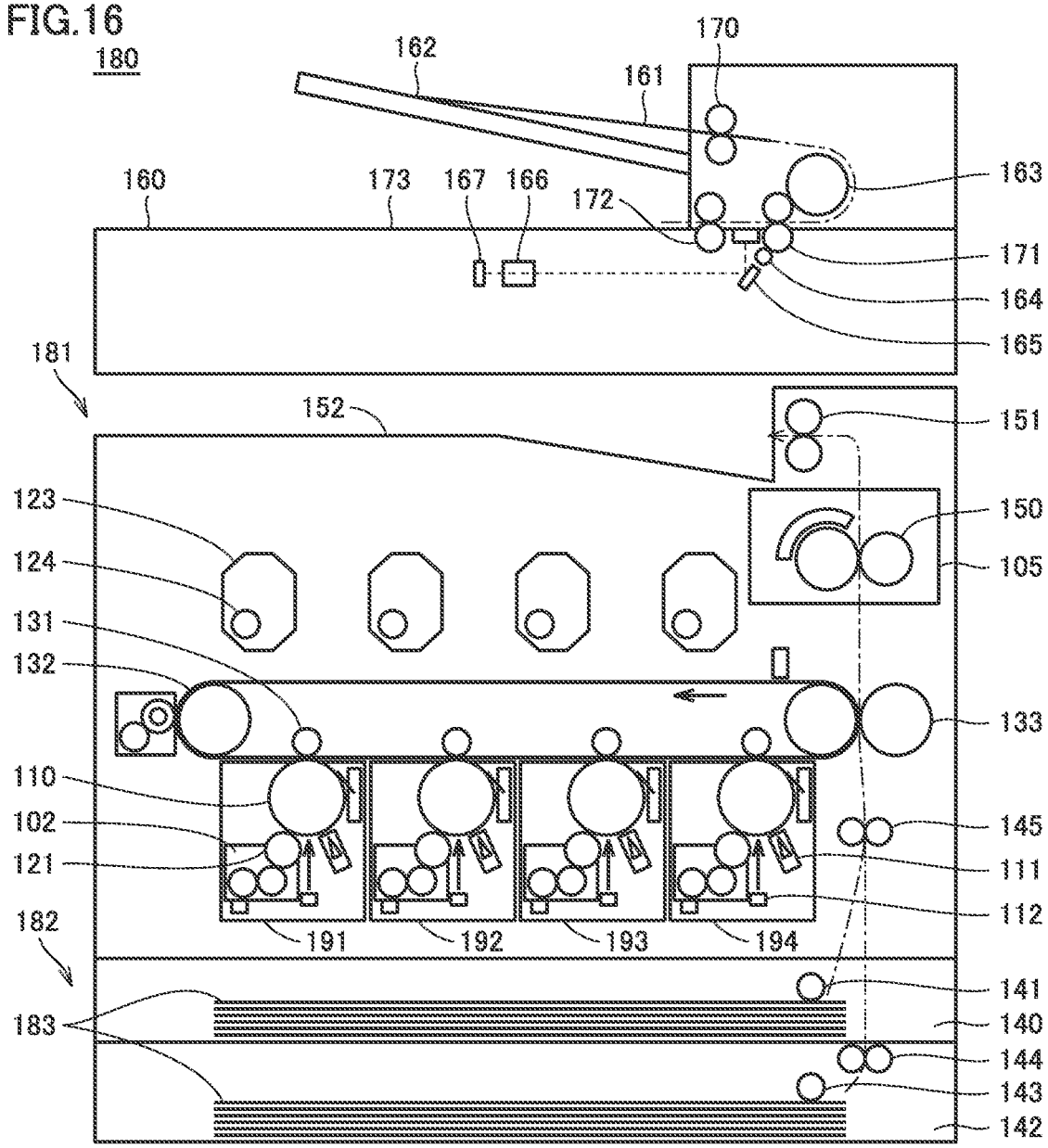
FIG. 16 is a cross-sectional view showing an example of the configuration of an image forming apparatus.

FIG. 16 is a cross-sectional view showing an example of the configuration of an image forming apparatus. It should be noted that the cross-sectional view in FIG. 16 is merely schematically shown and may be partially enlarged or modified in aspect ratio in order to simplify the illustration.

Referring to FIG. 16, an image forming apparatus 180 includes an imaging unit 181 configured as a tandem color printer, a paper feed mechanism 182, and a document reading device 160. Image forming apparatus 180 may be configured as a multifunctional peripheral (MFP) connected to a network and having functions such as a printer, a scanner, a copy machine, and a facsimile machine.

Imaging unit 181 includes four photoreceptor cartridges 191, 192, 193, 194, a primary transfer roller 131, a transfer belt 132, a toner bottle 123, a secondary transfer roller 133, and a fixing device 105. In the present disclosure, imaging unit 181 will also be referred to as an image forming unit.

Photoreceptor cartridges 191, 192, 193, 194 form toner images of four colors including yellow (Y), magenta (M), cyan (C), and black (K), respectively. Each of photoreceptor cartridges 191, 192, 193, 194 includes a cylindrical photoreceptor 110, a charging unit 111, an image exposure device 112 including a light source, and a developing device 102 including a developing roller 121.

Charging unit 111 uniformly charges the surface of photoreceptor 110 at a prescribed potential. Image exposure device 112 causes the image corresponding to a document image to be exposed to the charged region of photoreceptor 110. Thereby, an electrostatic latent image is formed on photoreceptor 110. Using developing roller 121 to which developing bias is applied, developing device 102 causes toner to adhere to the electrostatic latent image, thereby forming a visible toner image.

Also, four toner bottles 123 are provided corresponding to their respective photoreceptor cartridges 191, 192, 193, and 194. Toner is supplied from toner bottles 123 to their respective photoreceptor cartridges. A stirring fin 124 for stirring toner is provided inside each of toner bottles 123.

Four primary transfer rollers 131 are provided so as to face their respective four photoreceptors 110. Each of photoreceptors 110 and a corresponding one of primary transfer rollers 131 are pressed against each other with transfer belt 132 interposed therebetween. Furthermore, a bias for attracting toner is applied to each primary transfer roller 131. Thereby, the visible toner image on the surface of photoreceptor 110 after development is transferred onto transfer belt 132.

The visible toner image transferred onto transfer belt 132 is conveyed to the position of secondary transfer roller 133. A transfer voltage is also applied to secondary transfer roller 133 in the same manner as with the primary transfer roller. Thereby, the visible toner image conveyed by transfer belt 132 is transferred onto a sheet of paper as a recording medium 183 at a nip portion between secondary transfer roller 133 and transfer belt 132.

The visible toner image transferred onto recording medium 183 is conveyed to fixing device 105, Fixing device 105 has a fixing roller 150 and uses this fixing roller 150 to heat and pressurize recording medium 183, thereby fixing the visible toner image on recording medium 183. Recording medium 183 after fixation is discharged by a paper discharge roller 151 onto a paper discharge tray 152.

Paper feed mechanism 182 takes in a sheet of paper as recording medium 183 from paper feed cassettes 140 and 142, and then conveys the sheet of paper to secondary transfer roller 133. Paper feed mechanism 182 includes paper feed cassettes 140, 142, paper feed rollers 141, 143, a conveyance roller 144, and a timing roller 145. In the present disclosure, paper feed mechanism 182 is also referred to as a feeding mechanism. Furthermore, the paper feed roller is also referred to as a feed roller by which a recording medium is fed.

Recording media 183 housed in paper feed cassette 140 in the first stage are taken out one by one by paper feed roller 141 and conveyed to timing roller 145. Recording media 183 housed in paper feed cassette 142 in the second stage are taken out one by one by paper feed roller 143 and conveyed through conveyance roller 144 to timing roller 145.

Timing roller 145 stops the supplied recording medium 183, thereby adjusting: the timing at which the visible toner image transferred onto transfer belt 132 is conveyed to secondary transfer roller 133; and the timing at which recording medium 183 is supplied to secondary transfer roller 133.

Document reading device 160 reads the document image on a document sheet 161, to thereby generate image data. In the example shown in FIG. 16, document reading device 160 is provided above imaging unit 181. Document reading device 160 includes a document platen 162, a paper feed roller 170, document conveyance rollers 163, 171, a document discharge roller 172, a paper discharge tray 173, a light source 164, a mirror 165, a lens 166, and an image sensor 167 such as a charged-coupled device (CCD).

Document sheets 161 placed on document platen 162 are taken in one by one by paper feed roller 170. Document sheet 161 is conveyed by document conveyance rollers 163 and 171, and thereby, reaches a document reading position.

At the document reading position, light source 164 applies light upon the document image on document sheet 161. The light reflected on the surface of document sheet 161 is reflected by mirror 165, and thereafter, condensed by lens 166 so as to be incident upon image sensor 167. As a result, the document image on document sheet 161 is formed as an image on the sensor surface of image sensor 167, and the image data of the document image is produced by image sensor 167.

Document sheet 161 having passed through the document reading position is discharged by document discharge roller 172 onto paper discharge tray 173.

[Application of Brushless DC Motor to Driving Source of Roller]

In image forming apparatus 180 configured as described above, various types of rollers have been driven conventionally using stepping motors in many cases, but brushless DC motors are currently used in many cases. This is because there are problems that a stepping motor is larger in noise, greater in power consumption and lower in efficiency than a brushless DC motor.

However, for closed loop control, a normal brushless DC motor is provided with a Hall element or an encoder for detecting the rotation position of the rotor. Extra costs required for providing such a sensor also cause a new problem that the normal brushless DC motor is higher in cost than the stepping motor that allows open loop control. It is strongly desired to use a sensorless-type brushless DC motor in order to solve the above-described problems.

In this case, the sensorless type brushless DC motor requires estimation of the initial position of the magnetic pole of the rotor when the motor in the stopped state is started. As a method of estimating the initial position, generally, the stator is energized at a prescribed energization angle, and the magnetic pole of the rotor is attracted to the position corresponding to the energization angle, and thereafter, rotation of the motor is started.

However, in the case of image forming apparatus 180, the above-described method of attracting the magnetic pole of the rotor cannot be used particularly for the motors for driving paper feed rollers 141, 143 and 170 and timing roller 145. This is because the magnetic pole of the rotor is attracted to thereby cause a sheet of paper as recording medium 183 to be also moved together, which may causes a paper jam in the case of paper feed rollers 141, 143 and 170, and also, which may lead to difficulty in achieving accurate tinting control in the case of timing roller 145. For this reason, as already described above, the initial position of the magnetic pole of the rotor is estimated by the inductive sensing scheme by which a voltage at a level preventing rotation of the rotor is applied to the stator winding.

In this case, brushless DC motors for driving paper feed rollers 141, 143 and 170 and timing roller 145 need to be repeatedly started and stopped at frequent intervals specifically in the following reasons. Thus, when the motor is started, the initial position of the magnetic pole needs to be estimated in a short time period.

Specifically, by paper feed rollers 141 and 143 through which a sheet of paper as recording medium 183 is fed, consecutive two sheets of paper superimposed on one another (that is, multi feeding) leads to a poor image. For this reason, the distance between the sheets of paper needs to be ensured by a prescribed amount. Thus, each time one sheet of paper is fed, the motors for driving paper feed rollers 141 and 143 need to be repeatedly started, rotated and stopped. Also the initial position of the magnetic pole of the rotor needs to be estimated after the motor is stopped and before the motor is started next time. Accordingly, when images are continuously formed on a plurality of sheets of paper, the initial position of the magnetic pole of the rotor needs to be estimated in a short time period.

The above-mentioned feature is also applied to paper feed roller 170 used for taking in document sheet 161 for reading a document image. Furthermore, also for timing roller 145 serving to adjust the timing at which a sheet of paper as recording medium 183 is fed to secondary transfer roller 133, the motor for driving this timing roller 145 needs to be repeatedly started, rotated and stopped for each sheet of paper. Thus, the initial position of the magnetic pole of the rotor needs to be estimated in a short time period.

Furthermore, an example of the index for evaluating the performance of the image forming apparatus is first copy output time (FCOT). The FCOT indicates the time period (second) in a normal use state from when a start button is pressed to when the first sheet of copy paper is finished to be discharged. The FCOT also includes the time period in which recording medium 183 is fed and the time period in which document sheet 161 is read. Thus, also in order to shorten the FCOT, it is important to shorten the time period required to estimate the initial position of the magnetic pole of the rotor when the motors for driving paper feed rollers 141, 143 and 170 are started.

As described in the first and second embodiments, when the initial position of the magnetic pole of a rotor is estimated in an inductive sensing scheme, motor controller 70 of the present disclosure controls voltage application such that, after it applies a voltage to the stator winding at a prescribed energization angle, it applies a voltage to the stator winding at the next energization angle before the residual current flowing through the stator winding returns to zero. As a result, since the time interval between each energization can be shortened, the time period required to estimate the initial position of the magnetic pole of the rotor can be shortened.

In this case, as already described above, based on γ-axis residual current Iγ0, initial position estimation unit 57 of sensorless vector control circuit 50 corrects peak value Iγp of the γ-axis current obtained when a constant voltage is applied to stator winding 31 in a prescribed time period of energization to stator winding 31. Then, based on peak value Iγp_c of the γ-axis current a filer correction that is obtained at each energization angle $\theta_M$, initial position estimation unit 57 sets, as an initial position 0 of the magnetic pole of the rotor, energization angle $\theta_M[i]$ at which peak value Iγp_c of the γ-axis current reaches a maximum value. Thereby, even when a residual current exists, the initial position of the magnetic pole of the rotor can be estimated.

In order to more accurately estimate the initial position of the magnetic pole of the rotor, it is desirable that initial position estimation unit 57 correct the detected peak value Iγp of the γ-axis current at each energization angle $\theta_M$ according to the above-mentioned correction equation (9) or according to the correction table shown in FIG. 15.

On the other hand, document conveyance rollers 163 and 171 serving to convey document sheet 161 to a document reading position do not need to be stopped when image sensor 167 reads the document image on document sheet 161. This is because image sensor 167 can read each document image even when document sheets 161 are continuously conveyed. Thus, the motors for driving document conveyance rollers 163 and 171 do not need to be repeatedly started and stopped at frequent intervals. Other rollers in FIGS. 17A and 17B, for example, primary transfer roller 131, secondary transfer roller 133, fixing roller 150, paper discharge roller 151, document discharge roller 172, and the like also do not need to be repeatedly started and stopped at frequent intervals.

In this way, for the motors that do not need to be repeatedly started and stopped at frequent intervals, it is not necessary to shorten the time period required to estimate the initial position of the magnetic pole of the rotor. Accordingly, as shown in FIG. 7 by way of example, in the case where the initial position of the magnetic pole of a rotor is estimated in an inductive sensing scheme, after a voltage is applied to the stator winding at a prescribed energization angle, a voltage may be applied to the stator winding at the next energization angle after the residual current flowing through the stator winding returns to zero, in which case no problem occurs. Furthermore, in this case, the initial position of the magnetic pole of a rotor can be estimated without having to correct the detection value of γ-axis peak current Iγp at each energization angle $\theta_M$, thereby allowing simplified control.

In addition, when the motor needs to be repeatedly started, rotated, and stopped at frequent intervals as described above, it is more desirable to use an inner rotor-type brushless DC motor having excellent responsiveness due to its low inertia than to use an outer rotor-type brushless DC motor.

Figure 17A:
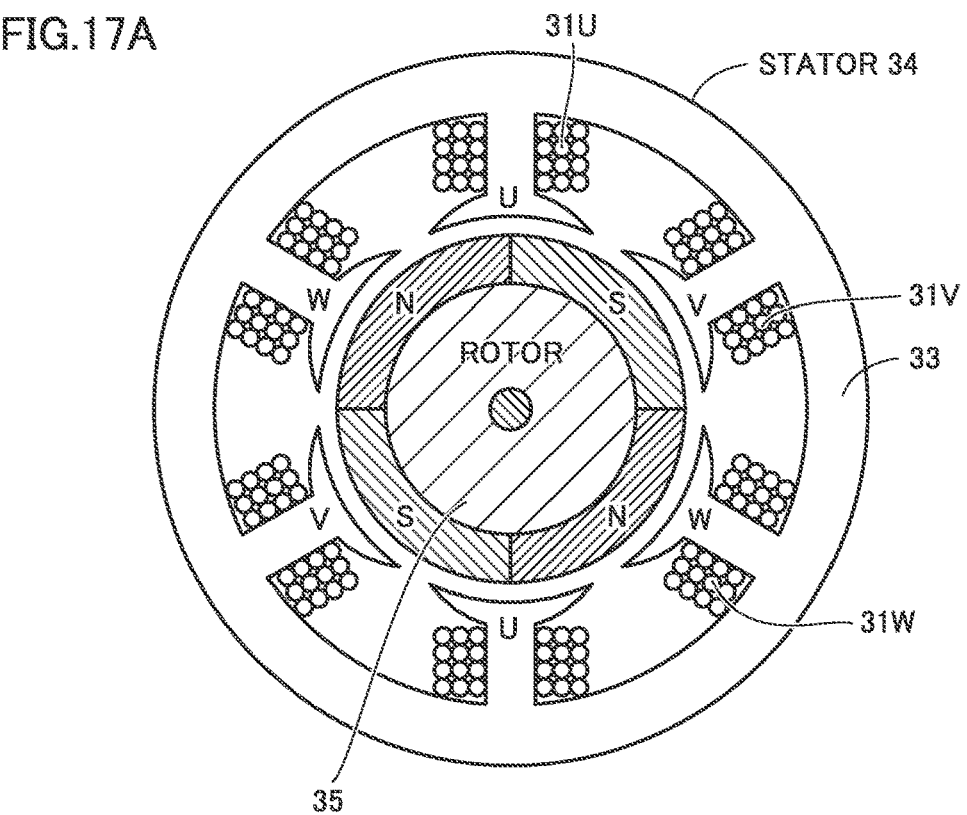
FIGS. 17A and 17B are cross-sectional views schematically showing the configuration of an inner rotor-type brushless DC motor and the configuration of an outer rotor-type brushless DC motor, respectively.
Figure 17B:
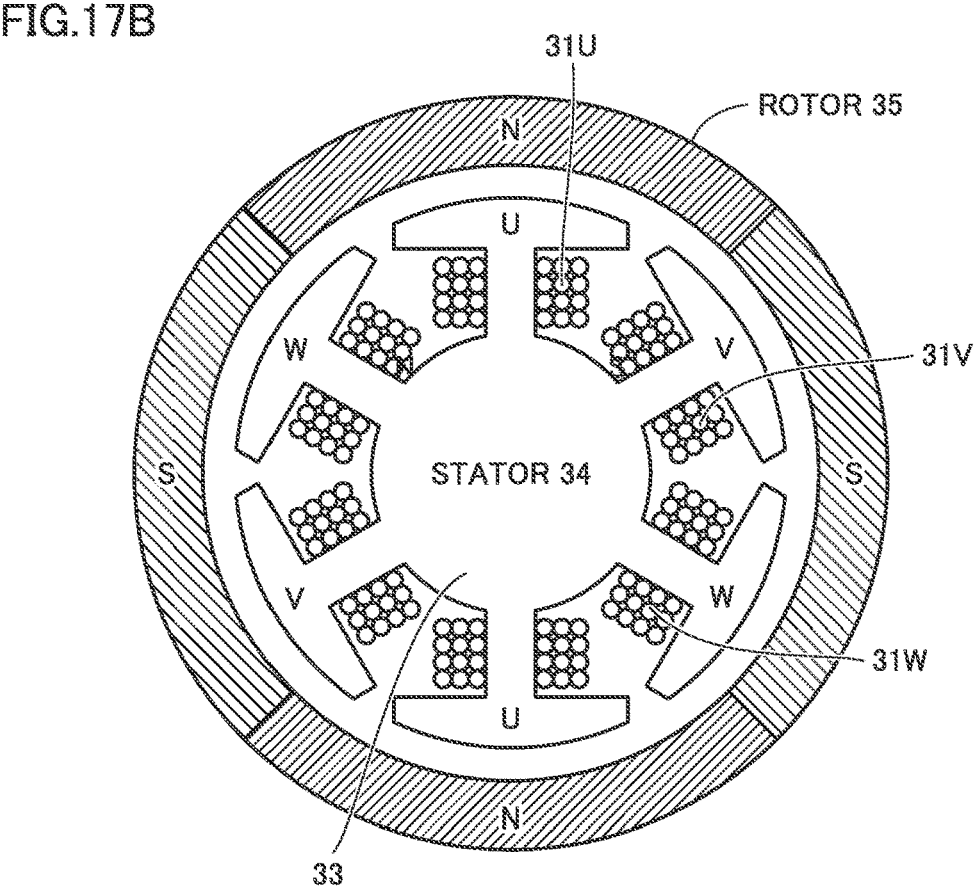

FIGS. 17A and 17B are cross-sectional views schematically showing the configuration of an inner rotor-type brushless DC motor and the configuration of an outer rotor-type brushless DC motor, respectively. FIG. 17A shows the configuration of an inner rotor-type three-phase brushless DC motor with four poles and six slots. FIG. 17B shows the configuration of an outer rotor-type three-phase brushless DC motor with four poles and six slots.

Referring to FIG. 17A, the inner rotor-type brushless DC motor includes a stator 34 disposed on the outer circumference of a rotor 35. The iron core of stator 34 includes an annular yoke 33 and six teeth that protrude inward from yoke 33. U-phase winding 31U is wound around two U-phase teeth. V-phase winding 31V is wound around two V-phase teeth. W-phase winding 31W is wound around two W-phase teeth.

The inner rotor-type brushless DC motor is advantageous since it can reduce the moment of inertia and therefore exhibits excellent responsiveness. Accordingly, the inner rotor-type brushless DC motor is suitable for motors for driving paper feed rollers 141, 143, 170 and tilting roller 145 that need lo be repeatedly driven and stopped at frequent intervals.

Referring to FIG. 17B, the outer rotor-type brushless DC motor includes a rotor 35 disposed on the outer circumference of a stator 34. The iron core of stator 34 includes a yoke 33 disposed in the vicinity of the rotation center of rotor 35, and six teeth protruding outward from yoke 33. U-phase winding 31U is wound around two U-phase teeth. V-phase winding 31V is wound around two V-phase teeth. W-phase winding 31W is wound around two W-phase teeth.

The outer rotor-type brushless DC motor is advantageous since it has relatively large moment of inertia, so that it can be rotated stably at a fixed rotation speed.

[Summary of Third Embodiment]

FIG. 18 is a block diagram showing the configuration of: a motor used for controlling driving of the roller of the image forming apparatus; and its controller. In the following, the above description will be summarized with reference to FIG. 18.

FIG. 18 representatively shows: a roller 90A that needs to be repeatedly started and stopped at frequent intervals; and a roller 90B that does not need to be repeatedly started and stopped at frequent intervals but is continuously driven to be rotated. Roller 90A corresponds to each of paper feed rollers 141, 143, 170 and timing roller 145 in FIG. 16. Roller 90B corresponds to each of other rollers in FIG. 16.

Since brushless DC motor 30A for driving roller 90A is repeatedly started and stopped at frequent intervals, brushless DC motor 30A is desirably of an inner rotor type that exhibits excellent responsiveness. On the other hand, brushless DC motor 30B for driving roller 90B may be of an inner rotor type or an outer rotor type.

Motor controller 70 includes a drive circuit 40A for driving brushless DC motor 30A, a sensorless vector control circuit 50A for controlling brushless DC motor 30A, a drive circuit 40B for driving brushless DC motor 30B, a sensorless vector control circuit 50B for controlling brushless DC motor 30B, and a high-order control circuit 60.

Since the configuration of each of drive circuits 40A and 40B is the same as that of drive circuit 40 in FIG. 1, the description thereof will not be repeated.

Sensorless vector control circuit 50A is identical in configuration and operation to sensorless vector control circuit 50 having been described in the first and second embodiments. Specifically, when brushless DC motor 30A is started, sensorless vector control circuit 50A estimates the initial position of the magnetic pole of the rotor that is in the rest state in an inductive sensing scheme. In this case, sensorless vector control circuit 50A controls drive circuit 40A such that, after a voltage is applied to a stator winding at a prescribed energization angle, a voltage is applied to the stator winding at the next energization angle before the residual current flowing through the stator winding returns to zero. In order to improve the accuracy of estimating the magnetic pole position, sensorless vector control circuit 50A corrects the detection value of peak value Iγp of the γ-axis current based on the value of γ-axis residual current Iγ0 that is measured simultaneously with or immediately before the start of energization. In this case, the detection value of peak value Iγp of the γ-axis current may be corrected according to the above-mentioned equation (9) or the table in FIG. 15. Sensorless vector control circuit 50A estimates the initial position of a rotor based on correction value Iγp_c of the γ-axis peak current after correction, which is obtained at each energization angle. Thereby, the initial position of the magnetic pole of a rotor can be accurately estimated in a short time period.

On the other hand, sensorless vector control circuit 50B performs approximately the same operation as that of sensorless vector control circuit 50 as described in the first embodiment, but is different from sensorless vector control circuit 50A in the method of estimating the initial position of the magnetic pole of the rotor of brushless DC motor 30B. Specifically, when estimating the initial position of the magnetic pole of a rotor in an inductive sensing scheme, sensorless vector control circuit 50B controls drive circuit 40B such that, after a voltage is applied to the stator winding at a prescribed energization angle, a voltage is applied to the stator winding at the next energization angle after a lapse of a time period in which the residual current flowing through the stator winding becomes zero. In this case, the initial position of the magnetic pole of the rotor can be estimated without having to correct the detection value of γ-axis peak current Iγp, thereby allowing simplified motor control. The control as described above does not cause any problem since roller 90B is continuously rotated without having to be repeatedly started and stopped at frequent intervals.

High-order control circuit 60 outputs a start command, a stop command, a rotation speed command value, and the like to sensorless vector control circuits 50A and 50B.

Each of the above-described sensorless vector control circuits 50A and 50B may be configured as sensorless vector control circuit 50 having the same configuration and including the first operational mode and the second operation mode. In this case, each sensorless vector control circuit 50 having the same configuration performs the same control operation as that of the above-described sensorless vector control circuit 50A in the first operational mode, and performs the same control operation as that of the above-described sensorless vector control circuit 50B in the second operation mode.

Although embodiments of the present invention have been described and illustrated in detail, the disclosed embodiments are made for purposes of illustration and example only and not limitation. The scope of the present invention should be interpreted by terms of the appended claims.

What is claimed is:

1. A motor controller that controls a brushless DC motor of a sensorless-type, the motor controller comprising:
   a drive circuit that applies a voltage to each phase of a stator winding of the brushless DC motor;
   a current detection circuit that detects a current flowing through the stator winding; and
   a control circuit that controls the drive circuit and estimates an initial position of a magnetic pole of a rotor of the brushless DC motor by causing the drive circuit to continuously or intermittently apply a constant voltage to the stator winding during a prescribed energization time period at each of a plurality of energization angles while sequentially changing the plurality of energization angles,
   wherein estimating the initial position includes:
   causing the drive circuit to apply the constant voltage at a first energization angle arbitrarily selected from among the plurality of energization angles and to subsequently apply the constant voltage at a second energization angle, wherein the drive circuit starts voltage application at the second energization angle after the drive circuit ends voltage application at the first energization angle and before a residual current flowing through the stator winding returns to zero;
   obtaining, at each of the plurality of energization angles, from the current detection circuit,
      a value of the residual current immediately before voltage application is started or at a time when voltage application is started, and
      a peak value of the current flowing through the stator winding during the prescribed energization time period; and
   correcting the peak value of the current by the detected value of the residual current to estimate the initial position of the magnetic pole of the rotor based on the corrected peak value of the current that is obtained at each of the plurality of energization angles,
   wherein correcting the peak value includes:
   correcting a peak value of a γ-axis current by multiplying a detected peak value of the γ-axis current by a correction coefficient corresponding to a γ-axis residual current based on a correction table showing a correspondence relation between a value of the γ-axis residual current and the correction coefficient.

2. The motor controller according to claim 1, wherein correcting the peak value includes:
   calculating the γ-axis residual current based on the residual current in each phase of the stator winding at each of the plurality of energization angles, the residual current remaining immediately before voltage application is started or at a time when voltage application is started;
   calculating the peak value of the γ-axis current at each of the plurality of energization angles based on the peak value of the current in each phase of the stator winding during the prescribed energization time period; and
   correcting the peak value of the γ-axis current using a value of the γ-axis residual current at each of the plurality of energization angles to estimate the initial position of the magnetic pole of the rotor based on the corrected peak value of the γ-axis current that is obtained at each of the plurality of energization angles.

3. The motor controller according to claim 2, wherein correcting the peak value of the γ-axis current includes subtracting a correction amount having a same sign as a sign of the γ-axis residual current from the peak value of the γ-axis current at each of the plurality of energization angles.

4. The motor controller according to claim 3, wherein an absolute value of the correction amount is smaller than an absolute value of the γ-axis residual current.

5. The motor controller according to claim 4, wherein the absolute value of the correction amount is larger as the absolute value of the γ-axis residual current is larger.

6. The motor controller according to claim 3, wherein the correction amount is equal to a product of:
   a value of the γ-axis residual current;
   an absolute value of the peak value of the γ-axis current; and
   a positive proportionality constant.

7. The motor controller according to claim 3, wherein the correction amount is equal to the γ-axis current.

8. The motor controller according to claim 1, wherein the brushless DC motor is an inner rotor-type brushless DC motor.

9. An image forming apparatus comprising:
a feed roller on which recording media are fed one by one;
an image forming unit that forms an image on each of the recording media that are fed;
a brushless DC motor of a sensorless-type for driving the feed roller; and
a motor controller that controls the brushless DC motor, wherein
the motor controller includes:
   a drive circuit that applies a voltage to each phase of a stator winding of the brushless DC motor;
   a current detection circuit that detects a current flowing through the stator winding; and
   a control circuit that controls the drive circuit and estimates an initial position of a magnetic pole of a rotor of the brushless DC motor by causing the drive circuit to continuously or intermittently apply a constant voltage to the stator winding during a prescribed energization time period at each of a plurality of energization angles while sequentially changing the plurality of energization angles,
estimating the initial position includes:
   causing the drive circuit to apply the constant voltage at a first energization angle arbitrarily selected from among the plurality of energization angles and to subsequently apply the constant voltage at a second energization angle, wherein the drive circuit starts voltage application at the second energization angle after the drive circuit ends voltage application at the first energization angle and before a residual current flowing through the stator winding returns to zero;
   obtaining, at each of the plurality of energization angles, from the current detection circuit,
      a value of the residual current remaining immediately before voltage application is started or at a time when voltage application is started, and
      a peak value of the current flowing through the stator winding during the prescribed energization time period; and
   correcting the peak value of the current by the detected value of the residual current to estimate the initial position of the magnetic pole of the rotor based on the corrected peak value of the current that is obtained at each of the plurality of energization angles,
wherein correcting the peak value includes:
correcting a peak value of a γ-axis current by multiplying a detected peak value of the γ-axis current by a correction coefficient corresponding to a calculated γ-axis residual current based on a correction table showing a correspondence relation between a value of the γ-axis residual current and the correction coefficient.

10. The image forming apparatus according to claim 9, further comprising:
   a conveyance roller on which each of the recording media is conveyed; and
   a second motor controller that controls a second brushless DC motor of a sensorless type for driving the conveyance roller, wherein
the second brushless DC motor includes a second rotor and a second stator winding,
the second motor controller includes:
   a second drive circuit that applies a voltage to each phase of the second stator winding;
   a second current detection circuit that detects a current flowing through the second stator winding; and
   a second control circuit that controls the second drive circuit and estimates an initial position of a magnetic pole of the second rotor by causing the second drive circuit to continuously or intermittently apply a constant voltage to the second stator winding during a prescribed energization time period at each of a plurality of energization angles while sequentially changing the plurality of energization angles,
estimating the initial position of the magnetic pole of the second rotor includes:
   causing the second drive circuit to apply the constant voltage at a first energization angle arbitrarily selected from among the plurality of energization angles and to subsequently apply the constant voltage at a second energization angle, wherein the second drive circuit starts voltage application at the second energization angle after a lapse of a time period during which a residual current flowing through the second stator winding becomes zero after the second drive circuit ends voltage application at the first energization angle;
   obtaining, from the second current detection circuit, a peak value of the current flowing through the second stator winding during the prescribed energization time period at each of the plurality of energization angles; and
   estimating the initial position of the magnetic pole of the second rotor based on the detected peak value of the current flowing through the second stator at each of the plurality of energization angles.

* * * * *